US007481176B2

(12) United States Patent
Pratt et al.

(10) Patent No.: US 7,481,176 B2
(45) Date of Patent: Jan. 27, 2009

(54) TRANSPORTABLE FLOTATION SYSTEM

(75) Inventors: James N. Pratt, Vicksburg, MS (US);
Tommy L. Bevins, Vicksburg, MS (US);
Bob E. Walker, Vicksburg, MS (US);
James C. Ray, Clinton, MS (US);
Michael J. Plackett, Corvallis, OR (US);
Donald T. Resio, Vicksburg, MS (US);
Frank E. Sargent, Vicksburg, MS (US);
Zeki Demirbilek, Vicksburg, MS (US);
Jimmy E. Fowler, Vicksburg, MS (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/806,532

(22) Filed: Jun. 1, 2007

(65) Prior Publication Data
US 2007/0295258 A1 Dec. 27, 2007

Related U.S. Application Data

(60) Provisional application No. 60/810,643, filed on Jun. 5, 2006.

(51) Int. Cl.
*B63B 35/44* (2006.01)
(52) U.S. Cl. .......................... 114/264; 14/27
(58) Field of Classification Search .......... 114/264, 114/266, 267; 14/2.6, 27
See application file for complete search history.

(56) References Cited
U.S. PATENT DOCUMENTS

| 1,854,336 | A | | 4/1932 | King |
| 2,321,677 | A | | 6/1943 | Higgins |
| 2,399,611 | A | | 5/1946 | Armstrong |
| 2,430,178 | A | | 11/1947 | Kurfiss |
| 2,977,612 | A | | 4/1961 | Frost |
| 3,160,900 | A | | 12/1964 | Sedlacek et al. |
| 3,685,074 | A | | 8/1972 | Marshall et al. |
| 3,999,879 | A | * | 12/1976 | Stachiw et al. ............... 14/27 |
| 4,145,786 | A | * | 3/1979 | Myers ........................ 14/27 |
| 4,286,538 | A | | 9/1981 | Matsui |
| 4,290,382 | A | | 9/1981 | Conti et al. |
| 4,335,670 | A | | 6/1982 | Skaalen et al. |
| 4,487,151 | A | | 12/1984 | Deiana |
| 4,561,376 | A | | 12/1985 | Fitzgerald-Smith |
| 4,754,723 | A | * | 7/1988 | Ghering ................... 114/267 |
| 4,864,958 | A | | 9/1989 | Belinsky |
| 5,107,785 | A | | 4/1992 | Baxter |
| 5,216,773 | A | | 6/1993 | Haakonsen |

(Continued)

*Primary Examiner*—Lars A Olson
(74) *Attorney, Agent, or Firm*—Earl H. Baugher, Jr.

(57) ABSTRACT

A transportable modular flotation system with sections incorporating a decked supporting structure that is buoyed by heavy duty flotation tubes. The sections are coupled together with pre-tensioned ropes, straps or cables of High Modulus Fiber. The system is suitable for off-loading items from cargo ships in small harbors and onto remote beaches. One embodiment is a heavy-duty lightweight modular causeway system (LMCS™) that is rapidly deployable and recoverable from a Joint High Speed Vessel (JHSV). Other embodiments of the present invention may be deployable floating piers or docks; modular commercial causeways, and expedient means to cross environmentally sensitive areas such as marshes or wetlands without employing major earthmoving equipment. Embodiments may also be used for wet-gap crossings, such as currently served by modular bridges, such as the Army Dry Support Bridge (DSB).

23 Claims, 19 Drawing Sheets

U.S. PATENT DOCUMENTS

| | | |
|---|---|---|
| 5,398,635 A | 3/1995 | Tellington |
| 5,588,387 A | 12/1996 | Tellington |
| 5,649,333 A * | 7/1997 | Chernjawski ............ 14/27 |
| 5,799,603 A | 9/1998 | Tellington |
| 5,906,171 A | 5/1999 | Kristensen et al. |
| 6,037,031 A | 3/2000 | Jones et al. |
| 6,381,792 B1 | 5/2002 | Woodfin |
| 6,470,820 B1 | 10/2002 | Wilkins |
| 6,651,578 B1 | 11/2003 | Gorman |
| 6,907,838 B2 | 6/2005 | Gorman |

* cited by examiner

A

B

TRANSPORTABLE FLOTATION SYSTEM

RELATED APPLICATIONS

Under 35 U.S.C. § 119(e)(1), this application claims the benefit of U.S. Provisional Patent Application No. 60/810,643, Transportable Flotation System, by Pratt et al., filed Jun. 5, 2006, and incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This patent has multiple assignees. This and related patents are available for licensing to qualified licensees. Please contact Phillip Stewart at 601 634-4113.

BACKGROUND

The U.S. Army's Objective Force requires an uninterrupted flow of supplies and equipment to support military operations. High priority materiel may be flown into an operational theater, however, the majority will be delivered by sealift. Studies indicate that a limited number of deep-draft ports coupled with the possibility for disruption of operations at these ports limit the suitability of strategic sealift in many areas. When major ports are not available, Joint Logistics Over The Shore (JLOTS) operations have been the primary alternative. However, the effectiveness of JLOTS operations is highly dependent on a number of critical factors, including weather and sea conditions in the theater of operations, conditions of a bare beach (surface condition, gradient, and tides), and the ability to position large mobile equipment, such as cranes, bulldozers and forklifts, ashore to support offloading operations and beach improvements. The ongoing transformation of the Army into a strategically responsive force requires technological solutions to the challenges inherent in disruptive scenarios. Thus, the U.S. Army and U.S. Navy are jointly supporting the evaluation, development, and acquisition of a new class of high-speed, shallow-draft vessels, termed the Joint High Speed Vessel (JHSV), as one means of addressing these challenges.

Smaller ports are about five times more abundant than those capable of supporting strategic sealift. The JHSV is able to access these smaller ports and deliver combat-configured units faster than both the Navy's strategic sealift and vessels involved in the Army's conventional JLOTS. Further, as few as one or two JHSVs provide vehicular throughput comparable to a conventional JLOTS operation, including one-way JHSV trips of up to 400 nautical miles. This is a significant improvement, especially when one considers the reduction in assets and personnel by employing JHSVs as compared to existing alternatives.

Existing transportable causeway systems, including the Army's Modular Causeway System (MCS), currently used by the U.S. Army in Joint Logistics Over The Shore (JLOTS) activities, the Navy's Lighterage System (NLS), and the Improved NLS (INLS) are capable of supporting the passage of a 72-ton M1A2 tank, albeit not without some considerable logistics expense. However, no existing transportable causeway or bridge system, such as the Improved Ribbon Bridge (IRB), currently used in most expedient river crossings, or the MCS, is capable of being deployed from JHSVs. Design criteria for an embodiment of the present invention, the Lightweight Modular Causeway System LMCS™), as compared to existing transportable causeways include: lighter weight, less stored volume, International Standards Organization (ISO) compatibility regarding Material Handling Equipment (MHE) specifications, rapid deployment from Joint High Speed Vessels (JHSVs), and capability to support and carry up to 80 tons, e.g., a loaded M1A2 tank.

Some advantages of the LMCS™ include significantly reduced weight, a smaller required storage volume and an efficient deployment scheme. For example, no "in-water" connections are required, reducing both the risk to personnel and the time for deployment.

DETAILED DESCRIPTION

Figure 1:
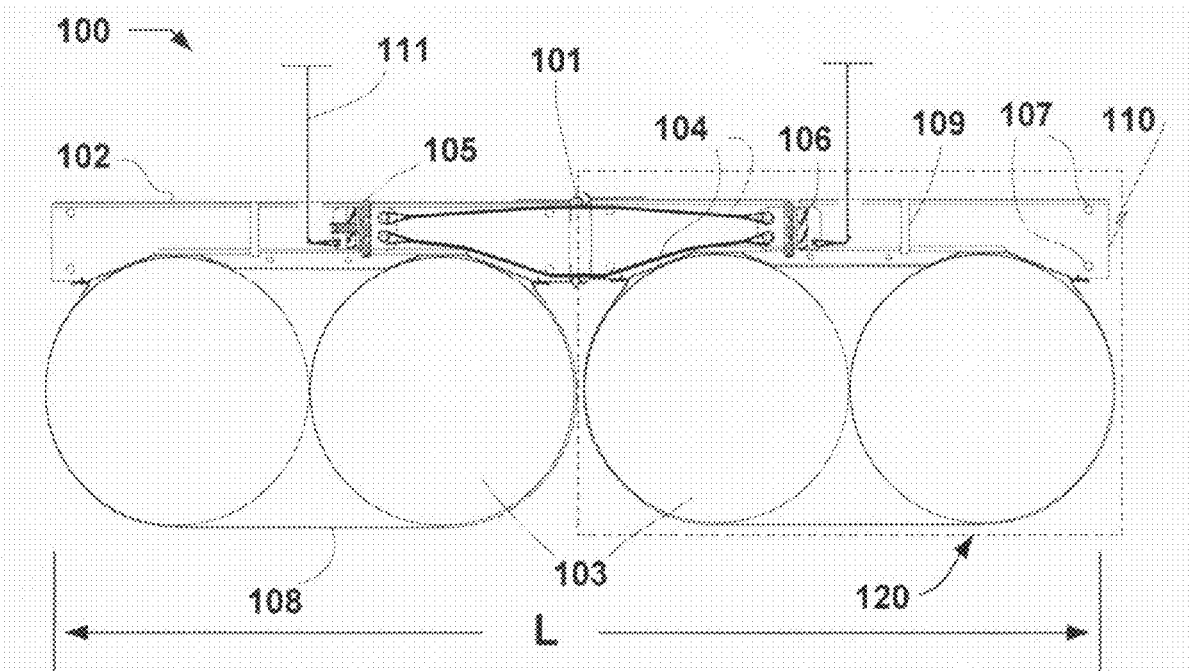
FIG. 1 is a schematic of an embodiment of the present invention employing a strap tensioning configuration as a connection means between sections.

In select embodiments of the present invention, a transportable flotation system comprises multiple sections connected one to another via multiple flexible couplers, each section further comprising elements that supply a buoyant force to the system when the system is deployed in a fluid. Each flexible coupler is tensioned prior to use of the system.

In select embodiments of the present invention, the system may be configured as a transportable causeway such that the sections may be stored spatially efficiently and the system may be assembled using COTS equipment and tools from a position on top of the system from initial deployment of the system in the fluid.

In select embodiments of the present invention, the sections further comprise support structure and decking affixed to the support structure.

In select embodiments of the present invention, the buoyant force is provided by one or more inflatable structures and the inflatable structures may be deflated for storage and transport of the system.

In select embodiments of the present invention, the system further comprises one or more tensioning devices for tensioning the flexible couplers.

In select embodiments of the present invention, the system operates in water, while in other embodiments the system may operate in a fluid with a viscosity greater than water, such as a marsh, wet mud, and the like.

In select embodiments of the present invention, the flexible couplers are constructed of high modulus fibers (HMF). In select embodiments of the present invention, the flexible couplers comprise straps, ropes, cables, and the like, and combinations thereof.

In select embodiments of the present invention, high modulus fibers are selected from the group consisting of fibers consisting of long molecular chains produced from poly-paraphenylene terephthalamide, liquid crystal polymer (LCP) fibers, ultra-high molecular weight polyethylene formed in a gel-spinning process, highly oriented rigid molecular structure fibers containing para-Aramid linkages, electron beam cross-linked thermoplastic polyurethane fibers, polyethylene napthalate fibers, lightweight high strength polyethylene fibers, and combinations thereof.

In select embodiments of the present invention, a transportable flotation system comprises multiple sections connected one to another via multiple pre-tensioned coupling elements such as straps, ropes, cables and the like and combinations thereof, each section further comprising one or more inflatable chambers.

In select embodiments of the present invention, the inflatable chamber is an inflatable tube having a cylindrical shape that may be deflated for storage and transport of the system.

In select embodiments of the present invention, the coupling elements are constructed of high modulus fibers (HMF) such as are available as a commercial off the shelf (COTS) item such as: KEVLAR®, VECTRAN®, SPECTRA®, TECHNORA®, ZYLON®, PENTEC®, PLASMA®, DYNEEMA®, BOB®, and the like, and combinations thereof.

In select embodiments of the present invention, a transporter carries a flotation system, comprising multiple sections connected one to another via multiple pre-tensioned coupling elements such as straps, ropes, cables and the like and combinations thereof, each section further comprising at least one inflatable chamber.

In select embodiments of the present invention, the transporter carries one or more flotation systems configured as a transportable causeway having sections that may be stored spatially efficiently on the transporter. In select embodiments of the present invention, the transportable causeways on the transporter may be assembled using COTS equipment and tools from a position on top of the transportable causeway from initial deployment of the causeway system in the fluid.

In select embodiments of the present invention, the transporter carries a transportable causeway having sections each comprising one or more support structures and decking affixed to the support structure.

In select embodiments of the present invention, the transporter carries a transportable causeway employing inflatable tubes having a cylindrical shape, such that the tubes may be deflated for storage and transport of the transportable causeway.

In select embodiments of the present invention, the transporter may operate in a fluid that has a viscosity greater than that of water.

In select embodiments of the present invention, the transporter may further carry one or more tensioning devices for tensioning the coupling elements of the transportable causeway.

In select embodiments of the present invention, the transporter operates in water. In select embodiments of the present invention, the transporter is a shallow-draft vessel. In select embodiments of the present invention, the shallow-draft vessel is a high-speed vessel. In select embodiments of the present invention, the high-speed shallow-draft vessel is the Joint High Speed Vessel (JHSV).

In select embodiments of the present invention, a transportable modular flotation system is suitable for off-loading items from cargo ships in small harbors and even onto remote beaches. One embodiment of the present invention is a heavy-duty lightweight modular causeway system (LMCS™) that is rapidly deployable from a Joint High Speed Vessel (JHSV). Embodiments of the present invention may be used as rapidly deployable modular causeways for the U.S Navy, Marine, and Army forces as well as for expedient evacuation or access means for Homeland Security needs or recovery from natural disasters. Other embodiments of the present invention may be deployable floating piers or docks; modular commercial causeways, and expedient means to cross environmentally sensitive areas such as marshes or wetlands without employing major earthmoving equipment, and the like.

Embodiments of the present invention employ high-modulus fabric (HMF) straps or ropes for axial pre-tensioning of the modules. In select embodiments of the present invention, the length of a section is oriented as the width of the flotation system so that the short dimension (width) of each module is joined together to make the length of the system.

Figure 7:
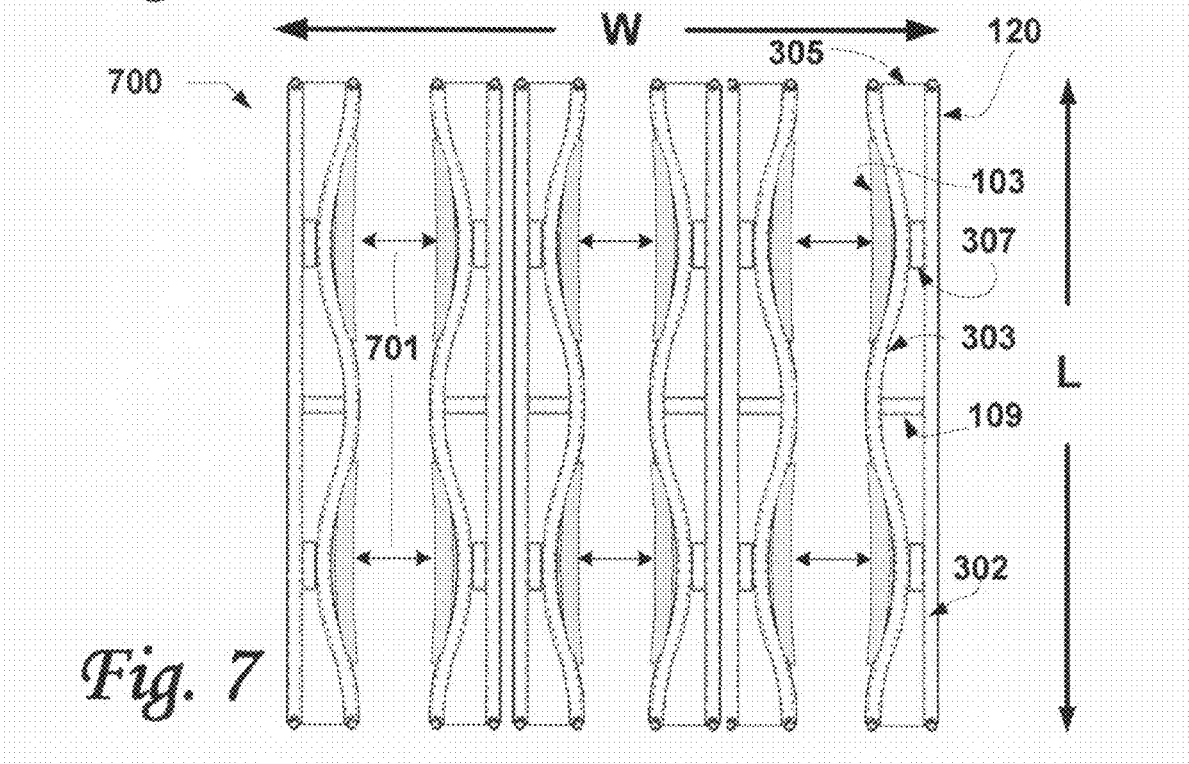
FIG. 7 is a top view of six modules of an embodiment of the present invention as configured for moving together for storage in a compact configuration.

In select embodiments of the present invention, HMF straps 104 (FIG. 1) are designed with sufficient slack along their length to allow modules 100 to be folded into a compact shipping configuration 700 as in FIG. 7. The arrows 701 indicate that the individual sections 120, as shown in FIG. 7 as a 6-section configuration, may be arranged to contact each other for compact storage with the flexible floatation devices 103 protected on the inside of the resultant configuration 700. Further, pre-tensioned HMF straps 104 are able to maintain structural bending within specified design limits, thus COTS HMF materials are suitable for making connections while maintaining appropriate freeboard levels. Strap length and constituent material may be modified to control the degree of compliance, e.g., as related to ability to withstand wave loading. A compliant floating structure adjusts itself to its environmental load rather than rigidly resisting forces such as those it may experience from waves and currents.

Refer to FIG. 1, a vertical profile of a cross section through a module 100 of an embodiment of the present invention comprising two sections 120 joined at their width ends 101 via pre-tensioned straps 104. In one embodiment, inflatable tubes 103 are employed for flotation and a deck section 102 incorporates box beams 110 and reinforcement members 109. The deck section may be affixed to the structure so as to be preferably readily removable and by any means known by those skilled in the art to include fasteners such as through-bolts, screws, "twist and seat" connectors, and the like. Preferably these connectors are retained within the deck section itself, i.e., the connectors are not separable from the deck section under ordinary operation so that one need not be concerned about losing small parts when working on the system in rough conditions. These tubes 103 may be employed in pairs under each section 120 and tied together as at 108. High-strength fiber straps 104, preferably of HMF material, run in enclosed sections such as the box beams 110. In select embodiments of the present invention, two of these straps 104 are employed in each box beam 110, one each along the top and bottom of the box beams 110. These are positioned by strap guides 107 and attached to similar points in a box beam 110 of an adjoining section 120. The mechanism 111 provided in the box beams 110 of each of the sections 120 tightens the straps 104 which are then held in place by means of a pin 105 inserted in a cavity 106. The mechanism 111 pre-tensions the straps 104 to draw the width ends 101 of the adjoining sections 120 together when the system is deployed. This mechanism 111 is set at deployment, i.e., it does not address the bending response once the system is deployed. In select embodiments of the present invention, HMF straps 104 or ropes comprised of materials such as KEVLAR®, VECTRAN®, and SPECTRA®, are employed to connect modules 100 to form a sectioned yet structurally stiff structure allowing the system to behave similar to a single structural beam as it supports heavy transiting loads. HMF materials are capable of supporting high tensile loads and provide structural rigidity while being relatively flexible. This allows a floating structure, such as a causeway, to be somewhat compliant in an unstable environment such as in Sea State 3.

The advantages of HMF ropes or straps include: lighter than mechanical joints; modules comprise two sections pre-connected at the manufacturer and require less storage volume than mechanically connected sections; dangerous "in-water" connections are not required; may employ automated systems to engage and disengage connectors to reduce time to deploy; and capacity to support loads up to 80 tons. Moreover, HMF ropes and straps are compliant, absorbing wave and current-induced forces, and are capable of withstanding at least Sea State 3 conditions. Mechanical connections, on the other hand, are highly prone to failure from wave and current forces, a significant problem that still plagues existing causeway systems.

Figure 26:
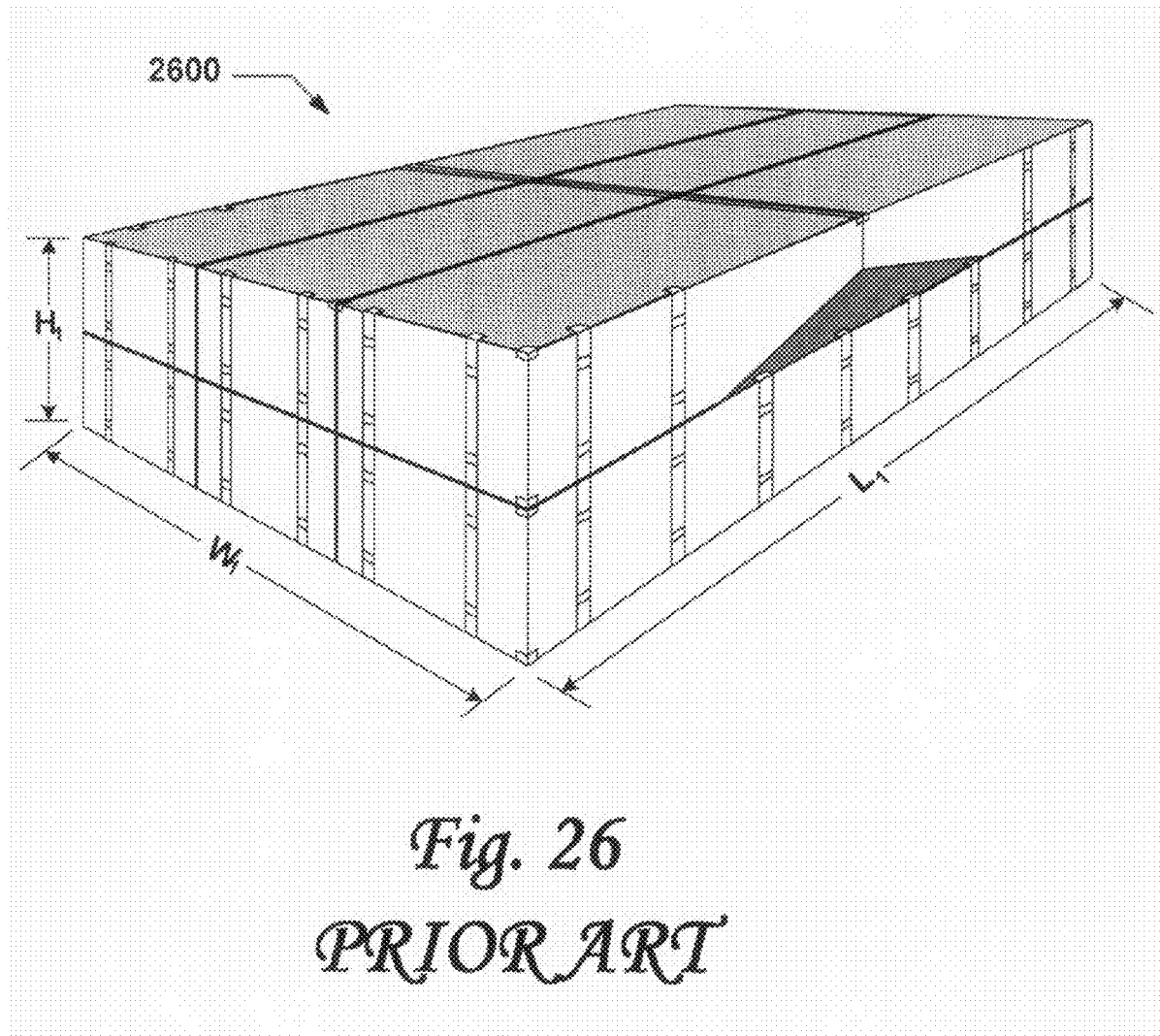
FIG. 26 is a perspective of relative dimensions of the Modular Causeway Section of the prior art in stowed configuration.
Figures 27A, 27B:
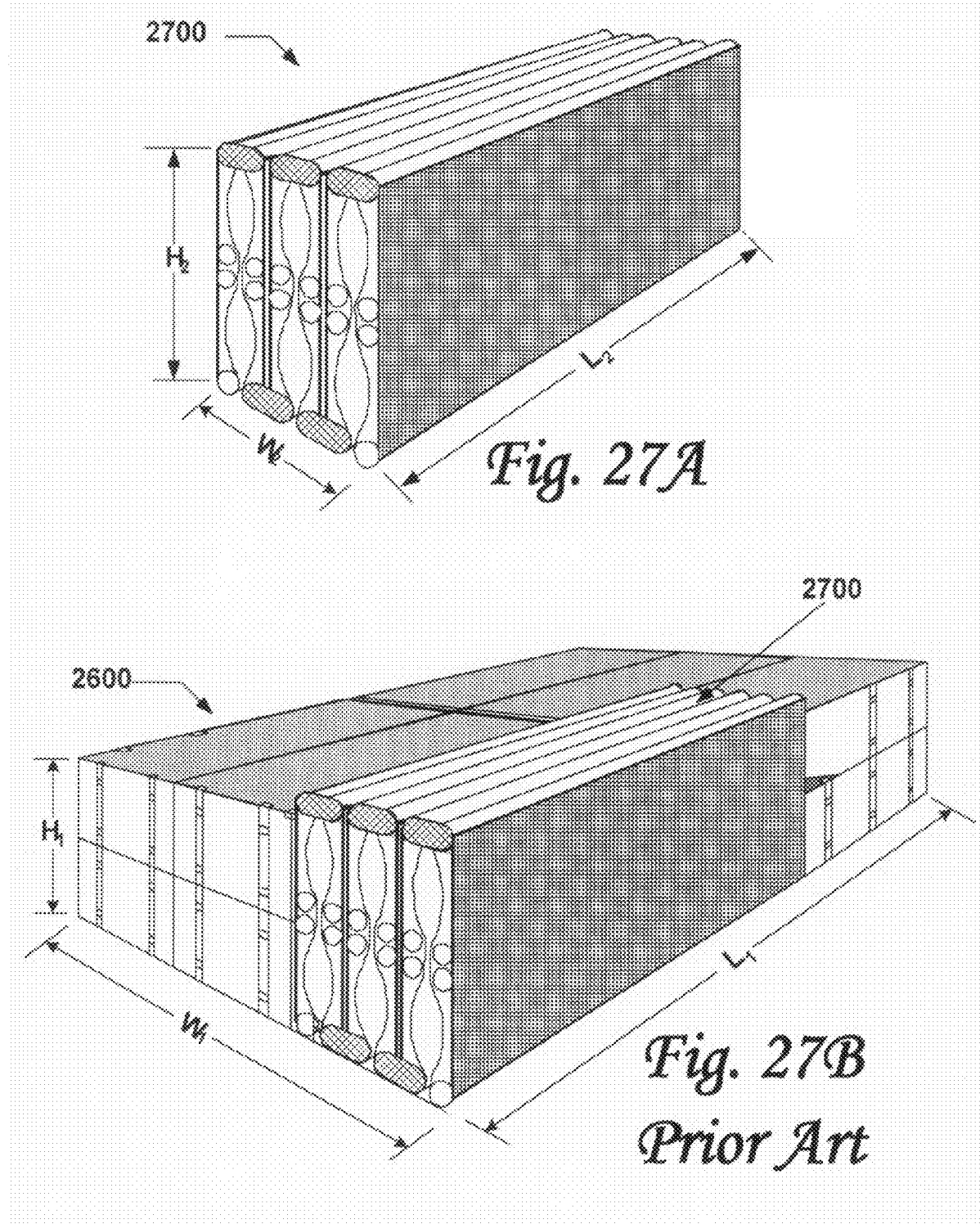
FIG. 27A is a perspective of relative dimensions of an embodiment of the present invention in stowed configuration.
FIG. 27B depicts relative dimensions of the Modular Causeway Section of the prior art in stowed configuration as compared to the equivalent section of an embodiment of the present invention in stowed configuration.

Refer to FIGS. 26, 27A and 27B. An embodiment of the present invention is rapidly deployable and is transportable by air, sea or land. FIG. 26 is a perspective of the prior art MCS 2600 in its stowed configuration. This embodiment of the prior art system 2600 in its stowed configuration has dimensions of $L_1=40'$, $W_1=24'$ and $H_1=9'$, resulting in a required storage space of 8,640 ft$^3$. When deployed this configuration 2600 provides 80' of mobile causeway. FIG. 27A is a perspective of a representative embodiment of the present invention in a stowed configuration 2700. This configuration 2700 has dimensions of $L_2=20'$, $W_2=9'$ and $H_2=10'$, resulting in a required storage space of 1,800 ft$^3$. When deployed the configuration 2700 provides 60' of mobile causeway. FIG. 27B is a perspective of the relative size of each of the stowed configurations 2600, 2700 when the configuration 2700 is placed within that of the configuration 2600. Thus embodiments of the present invention require a storage volume (for an equivalent length of causeway) that is $2400/8640^{th}$, or approximately 28%, of that of the MCS 2600.

Figure 2:
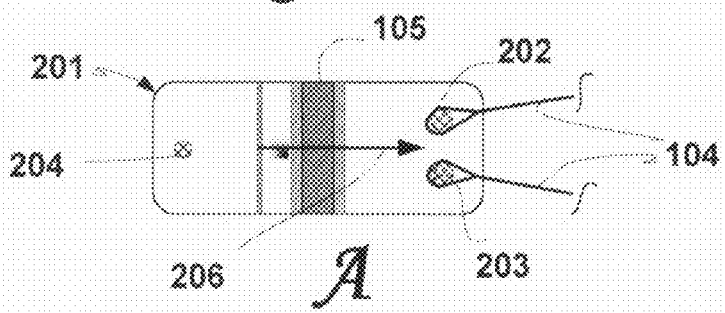
FIG. 2 illustrates a manual tensioning device that may be used with the configuration of FIG. 1.
Figure 2:
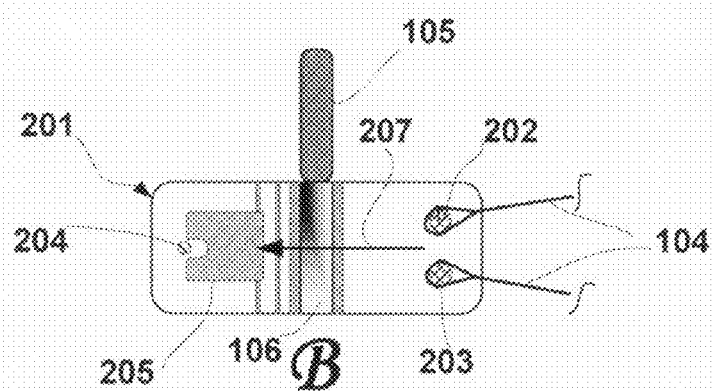

Refer to FIG. 2. The mechanism 201 is shown at A as tensioned or closed and at B as open or un-tensioned. The straps 104 are pre-tensioned by a mechanical screw mechanism 201 that slides linearly as indicated by the arrows 206, 207. In select embodiments of the present invention, HMF straps 104 are attached at specific upper 202 and lower 203 points and the mechanism 201 locked in its tensioned or closed position with a pin 105. Upon opening the mechanism as in B, it is prevented from moving apart by the stop 204 and a stop plate 205. A similar, but automated mechanism (not shown separately), may also perform this function.

Figure 3:
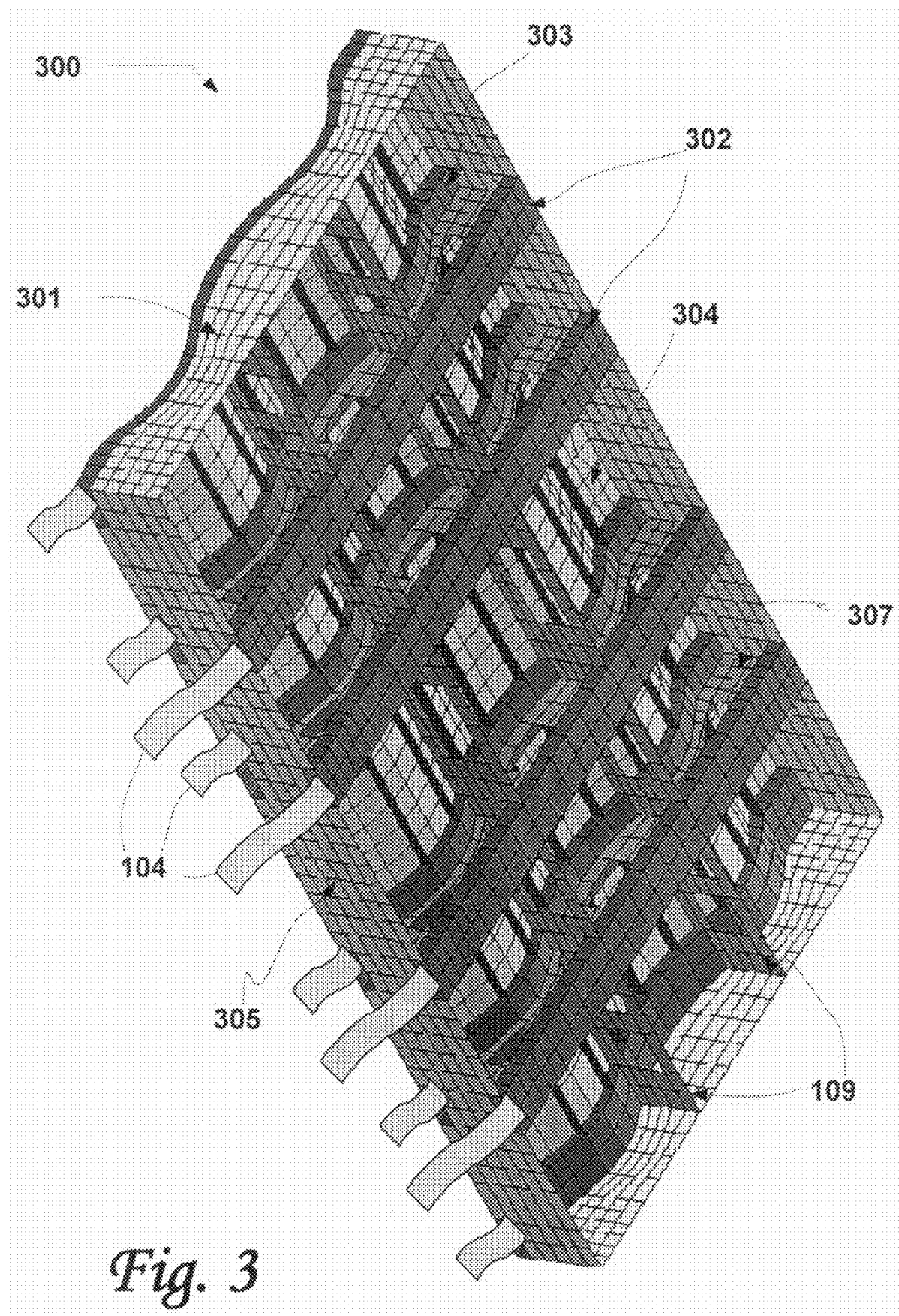
FIG. 3 depicts an embodiment of the present invention as may be represented by a finite element model (FEM).

Refer to FIG. 3, a perspective view of a wire-frame section 300 of a "high freeboard" embodiment graphically represented via a Finite Element Model (FEM). FIG. 3 shows sides 301 and ends 305 of a section 120 (FIG. 1) supported by two inflatable tubes (not shown separately in FIG. 3). Upon system deployment, HMF straps 104 are pre-tensioned through upper box beams 302 and lower box beams 303 supporting the upper decking 102 (FIG. 1) (not shown separately in FIG. 3) and flooring 304, respectively. Reinforcement members 109 perpendicular to the box beams 302, 303 provide additional torsional rigidity and support for decking 102 when combined with spacing supports 307 between upper 302 and lower 303 box beams.

Figure 4:
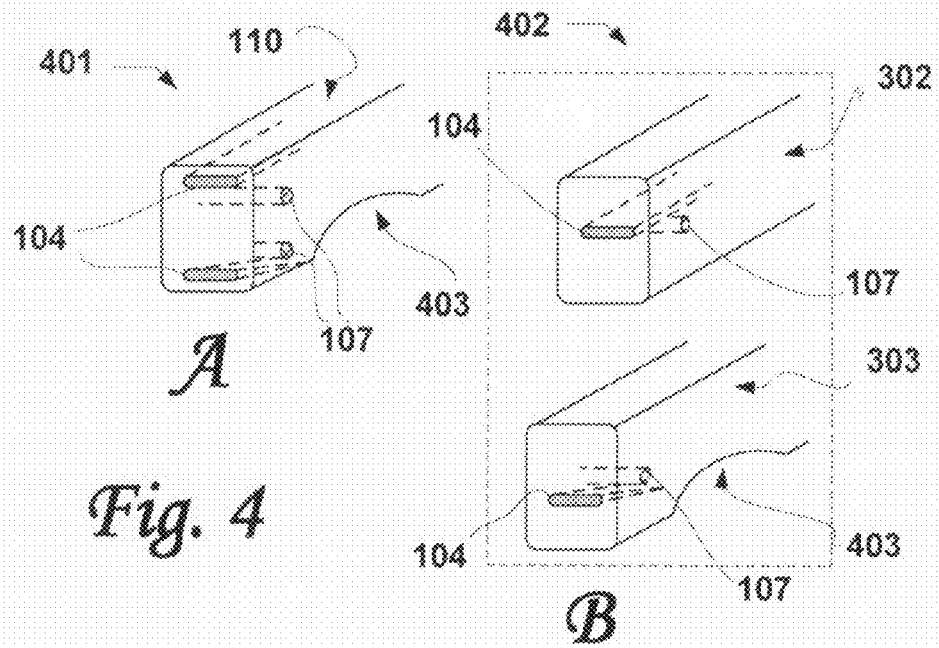
FIG. 4 depicts perspective end views of two embodiments of supporting box beams that may be used in embodiments of the present invention.

Refer to FIG. 4, showing perspective end views 401, 402 of a single box beam 110 (low freeboard) configuration at A and a stacked box beam 302, 303 (high freeboard) configuration at B. The end view 401 of the single beam configuration A is a perspective end view of the beam 110 provided in profile in FIG. 1 that also shows the cutout 403 for the flotation tubes 103. The end view 402 of the stacked beam configuration B is a perspective end view of the beams 302, 303 provided in perspective plan view in FIG. 3 that also shows a cutout 403 that may be used for the flotation tubes 103.

Figure 5:
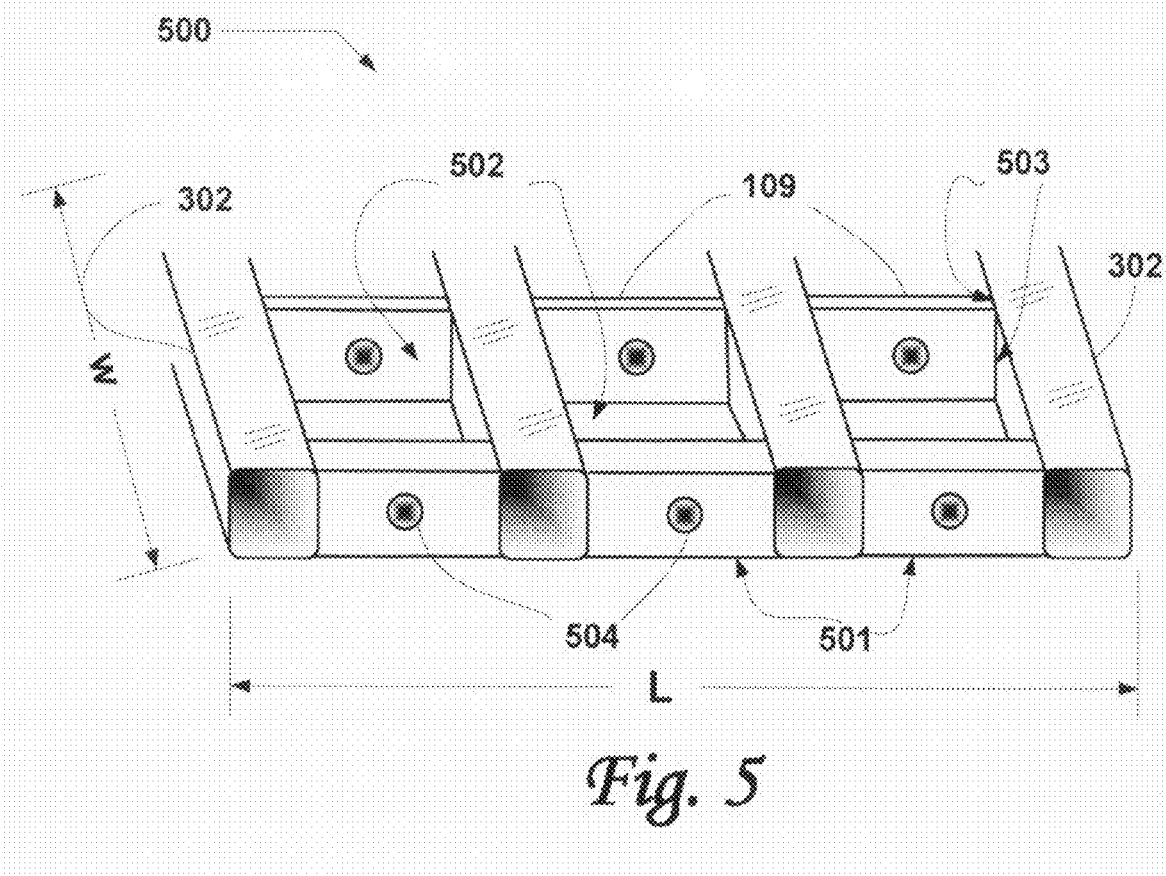
FIG. 5 is a perspective view of the end of deck structure that may be used in an embodiment of the present invention.

Refer to FIG. 5, showing a perspective end view of a section of decking support 500 that may be employed in an embodiment of the present invention. The box beams 302 are the same as shown for the upper beam 302 of FIG. 3. Neither the straps 104 nor the lower floor 304 are shown in FIG. 5. The reinforcing braces 109 are shown between the box beams 302 and may be welded thereto along their ends at 503 for example. The ends of the decking support 500 are short box beams 501 that are affixed to the longitudinal box beams 302, preferably by welding. The box beams 302, end sections 501 and reinforcing members 109 outline "empty boxes" 502 within the decking support structure 500. These boxes 502 may be filled with flotation material to increase buoyancy in rough seas should the structure 500 be swamped by wave action. In select embodiments of the present invention, reclosable openings 504 offer access to each box 502 such that an expandable foam may be sprayed in to the boxes 502 (after decking is placed on top of the structure 500 to contain expansion of the foam), the short beam boxes 501 of the ends, or both.

Figure 6:
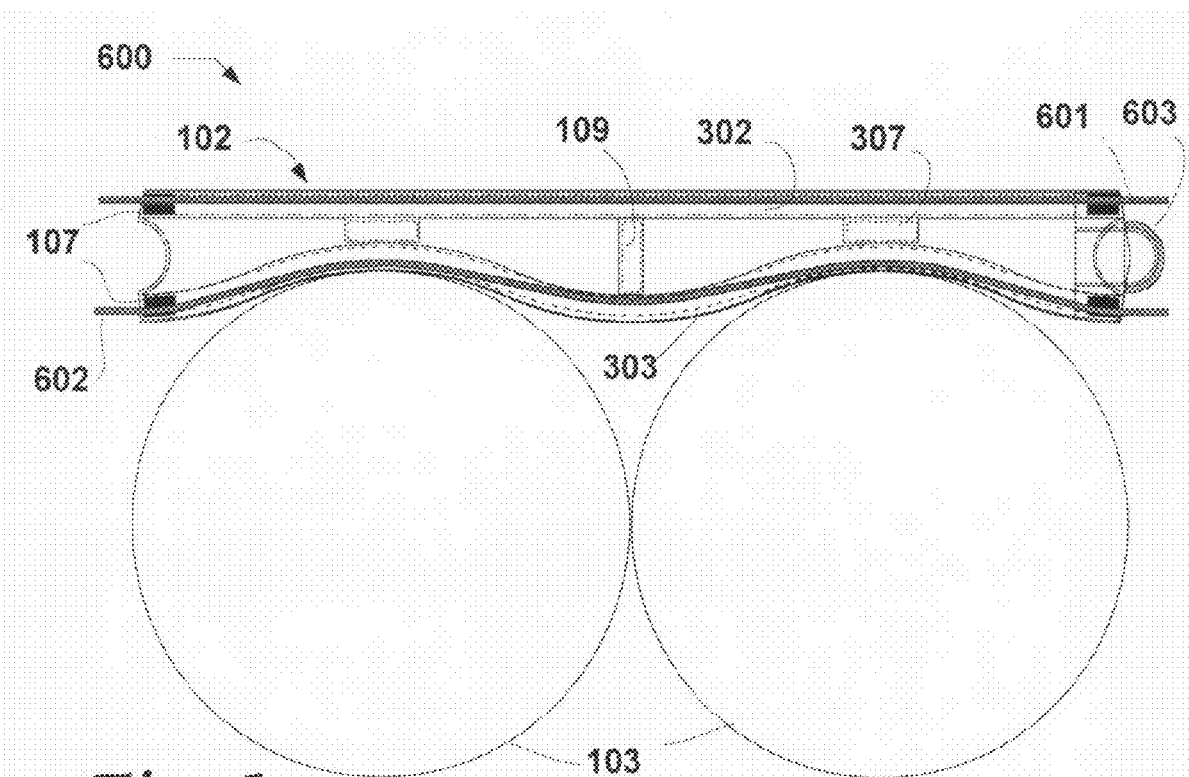
FIG. 6 is an elevation view of a single deployed module of an embodiment of the present invention that employs a continuous loop strap as a connection means.

Refer to FIG. 6 depicting a light-duty low-freeboard section 600 of an embodiment of the present invention. Although appearing similar to the section 120 of FIG. 1, this embodiment uses a continuous loop of upper 601 and lower 602 straps. The sections 600 join at two semi-circular halves 603 at each end. Embodiments of the present invention employing this configuration may be used for light loads such as passenger vehicles and light-duty trucks.

Refer to FIG. 7, depicting a top view of one possible configuration 700 for storing a heavy-duty (high freeboard) embodiment of the present invention such as that represented by FIG. 3. Two pairs of sections 120 are stacked decking-to-decking and a single section 120 is stacked bottom-to-bottom on each end of the two stacked pairs. This yields a configuration of six sections 120 that have decking 102 exposed along both longitudinal sides thus protecting the fragile inflatable tubes 103. For a typical embodiment of the present invention L is about 3 m (10 ft) and W is about 2.7 m (9 ft).

Figure 8A:
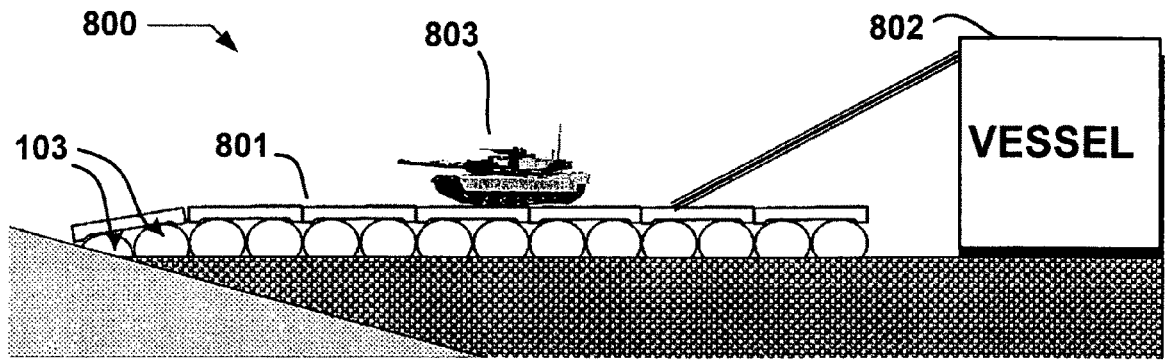
FIG. 8 is an artist's concept of a full-size embodiment of the present invention as may be used to deploy a main battle tank from a Joint High Speed Vessel (JHSV) delivery system.
Figure 8B:
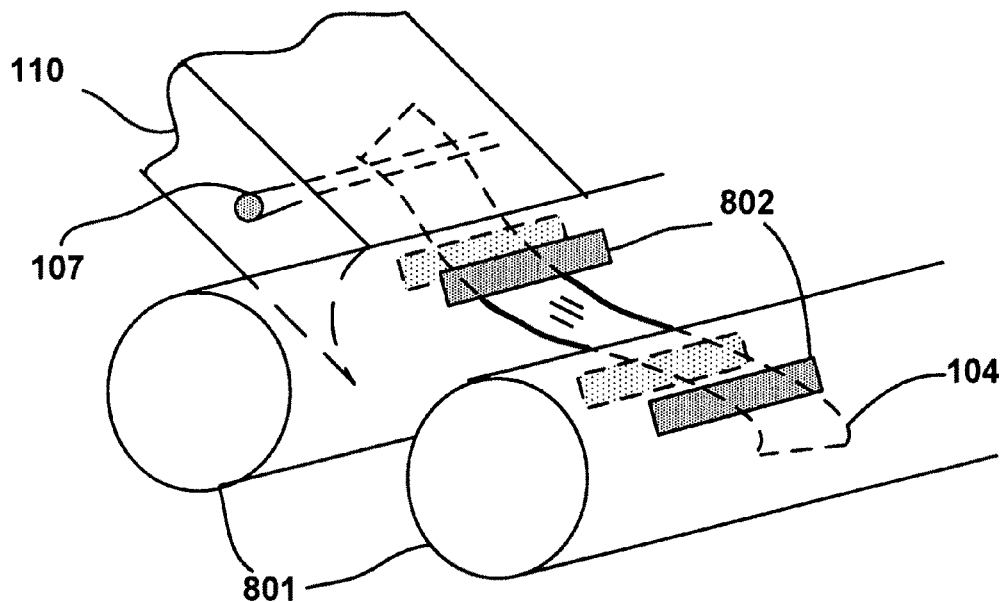

Refer to FIG. 8, an artist's rendering 800 of the offloading of a main battle tank 803 from a JHSV 802. Note the multiple decking sections 801 needed to support the compressive loading of such a heavy and wide vehicle. Also note the manner in which the structure "kneels" as an off ramp by simply deflating incrementally the last two flotation tubes 103.

Figure 9:
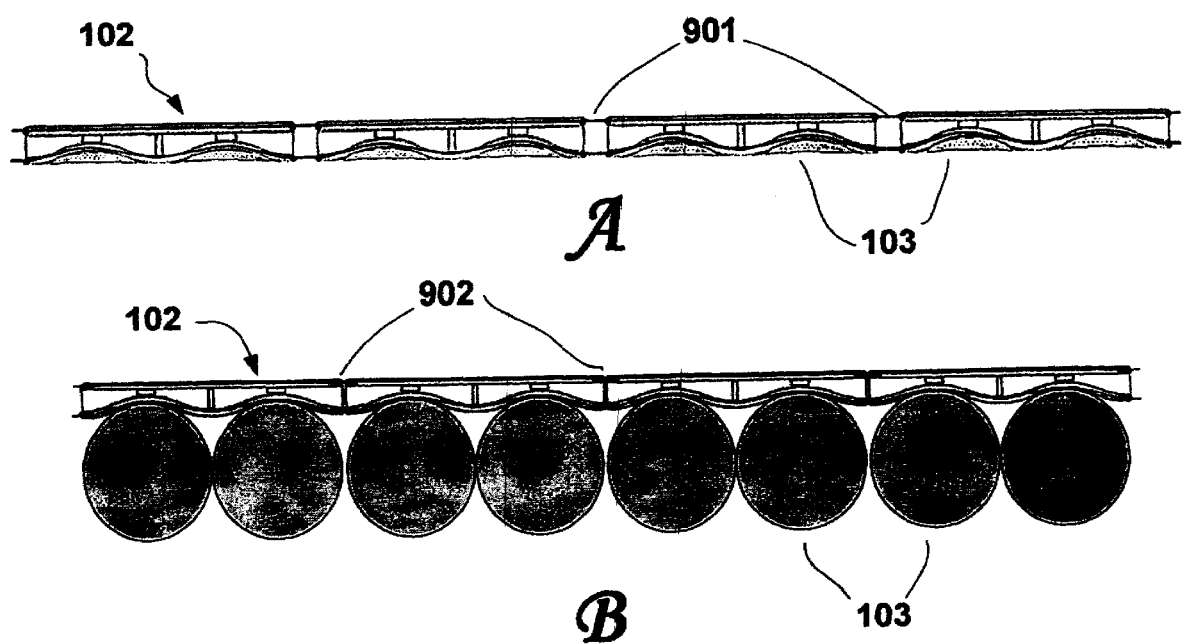
FIG. 9 illustrates straps and flotation devices of an embodiment of the present invention as initially deployed and after flotation devices are inflated.

Refer to FIGS. 7 and 9 depicting sections 120 of an embodiment of the present invention as configured similar to that of FIG. 1 as may be packaged for transport (FIG. 7) and as may be deployed (FIG. 9). The system is first unfolded from its packaged configuration (FIG. 7) and placed in the water in the loosely connected configuration A. The straps 104 are loose as indicated at 901 and the flotation tubes 103 deflated. As shown in configuration B, the tubes 103 are inflated and the straps 104 are tightened as shown at 902 to form a single, "beam-like" rigid system. After tightening the straps 104, the decking 102 may be applied and additional sections 120 added as necessary.

In select embodiments of the present invention, the method for using embodiments of the present invention includes: pre-threading HMF ropes or straps 104 through a locking mechanism 111 for connecting the modules 100 and encasing closed-cell foam in the "boxes" 502 formed by deck supporting structure 500 in the individual modules 100. This allows an unloaded system to float upon initial deployment in water and prior to inflation of the flotation tubes 103.

In select embodiments of the present invention, once a series of these loose, pre-connected modules 100 are deployed over the water, the flotation devices 103 are filled. Next, the straps 104 are "pre-tensioned," either manually by an operator or by using an automated tension system to take up the slack and draw the individual modules 100 together as depicted at B in FIG. 9. Pre-tensioning the HMF straps 104 or ropes puts them in working range prior to applying a payload. Once a pre-tension load is reached and the locking mechanism 111 is applied, the system is available for use. Experimentation demonstrated that discontinuous strap sections 104 as shown in FIG. 1, rather than continuous strap sections 602, 603 as shown in Fig. 6 were necessary to support very heavy loads on this type of floating structure.

In order to validate both the conceptual design basis of embodiments of the present invention and the deflection estimates obtained from the finite element modeling, a precise ⅓-scale model was constructed. The ⅓-scale model was tested in the wave basin at the U.S. Army Engineer Research and Development Center (ERDC) with and without deck loading for sea-keeping characteristics (static tests). The scale model was also evaluated with and without deck loads in sea states (waves) up to Sea State 3 conditions (dynamic tests). Roll and dynamic motion was observed and established how embodiments of the present invention may handle routine and extreme sea states.

Table 1 shows the scaling factors used. Appendix C contains a discussion of the basic scaling relationships for this type of modeling. All properties were scaled as closely as possible to the prescribed relationships in this Appendix; consequently, results should be very close to those expected at full scale. Results for all loading tests on the ⅓-scale model agree well with corresponding finite element model results. As was the case for the numerical results, results from these physical model tests clearly demonstrated that the LMCS™ embodiment of the present invention is capable of supporting the passage of a 72-ton vehicle, such as a main battle tank. FIG. 3 shows the deformation of the ⅓-scale model under a scaled loading equivalent to a 72-ton main battle tank, i.e., 5400 lbs, i.e., approximately 144,000 lbs divided by 27. As is shown in FIG. 6B, the deflections of the ⅓-scale physical model are generally consistent with the deflections estimated in the finite element model.

TABLE 1

Scaling Parameters

| Parameter | Full scale | ⅓-Scale |
|---|---|---|
| Geometry, λ | | |
| Hull, L × W × H (ft) | 10 × 20 × 1.5 | 3.33 × 6.67 × 0.5 |
| Flotation, dia. (ft) | 5.0 | 1.67 |
| Force/Weight Per Module, $\lambda^3$ | | |
| Weight (lb) | 6,000 | 222 |
| No. of HMF straps | 12 | 8 |
| Design Working Load ($10^3$ lb/cable) | 210 | 11.575 |
| Pre-tension ($10^2$ lb/cable) | 83 | 4.6 |
| Stiffness, EI, $\lambda^5$ | | |
| Module ($10^8$ lb-in$^2$) | 376 | 1.59 |

In a simple beam, bending (curvature) is a function of loading, which tends to increase the bending, and the product, EI, of Young's modulus of elasticity, E, and the moment of inertia, I. Two different analytical solutions for a floating beam of arbitrary EI and load were derived as given in Appendix A. These solutions and related finite-element models demonstrated interrelationships among relevant design and loading parameters. This led to the formulation of a system for carrying loads via floating means such as transportable causeways. High-strength fiber straps, such as those composed of high modulus fiber (HMF), carry the tension loading on the top and bottom of the "beam," e.g., a floating causeway's structural support, while the deck 102 and supporting structure, such as box beams 110, carry the compression loading.

Figure 10:
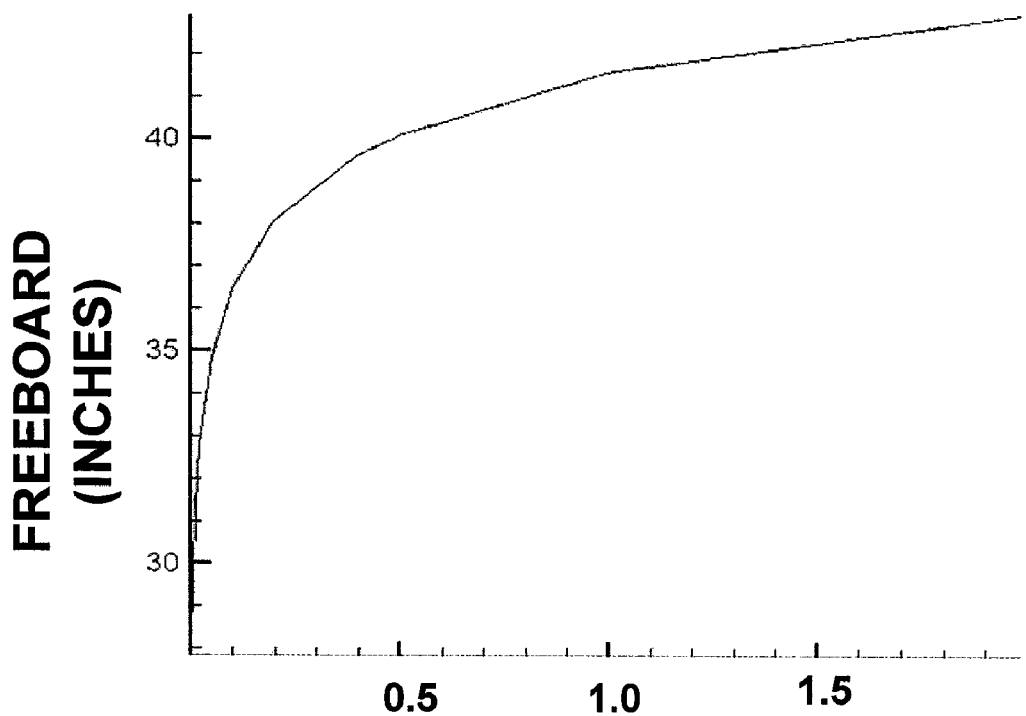
FIG. 10 is graph depicting the relationship of Freeboard to $EI \times 10^9$ for a representative embodiment of the present invention.
Figure 28:
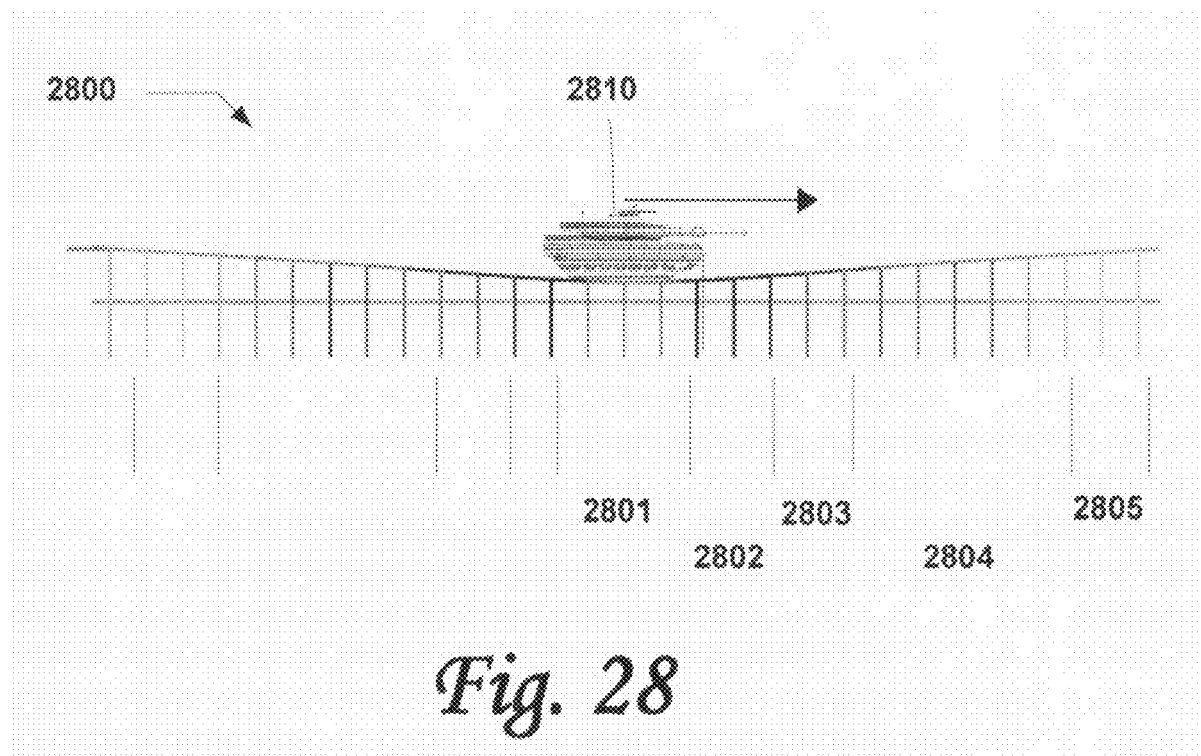
FIG. 28 is a graphical representation of a mathematical model of the forces encountered by portions of an embodiment of the present invention carrying a heavy load such as a tank.

In addition to the analytical solutions given in Appendix A, extensive finite element model investigations were conducted to optimize performance. A description of the mathematical models used in these studies and some of the results are given in Appendix B. As can be seen there and in Appendix D, a number of commercial-off-the-shelf (COTS) high strength fibers meet the demands for the tension component or "stiffness," EI. The results of mathematical modeling of a 72-ton load are graphed in FIG. 28. The deflection of an embodiment of the present invention under a 72-ton load is about 24 to 27 inches. As shown in FIG. 10, this maintains a freeboard in excess of 30 in. at maximum deflection for an embodiment of the present invention suitable for carrying a 72-ton load.

Additional information on the LMCS™, an embodiment of the present invention, is included in Appendix D (LMCS™ Tensioning System). With its innovative deployment method and given the very substantial reduction in weight and volume that this system offers, the LMCS™ has significant advantages over all other existing DoD causeway/bridging systems for many coastal, riverine, estuarine, mudflat, wetland, and inland applications. For example, in the event of blockage of inlets or channels by terrorists, embodiments of the present invention, such as an LMCS™, may be deployed to establish access to ports or emergency sites.

The abstract of the disclosure is provided to comply with the rules requiring an abstract that will allow a searcher to quickly ascertain the subject matter of the technical disclosure of any patent issued from this disclosure. 37 CFR §1.72(b). Any advantages and benefits described may not apply to all embodiments of the invention.

While the invention has been described in terms of some of its embodiments, those skilled in the art will recognize that the invention can be practiced with modifications within the spirit and scope of the appended claims. For example, although the system is described in specific examples for a transportable causeway, it may apply to any number of applications including structure that spans marshy or muddy terrain or even areas that are environmentally sensitive such as archaeological sites. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention should be defined only in accordance with the following claims and their equivalents.

APPENDIX A

A Closed-Form Solution for the Two-Dimensional (2D) Deformation of a Floating Beam Under a Load The general equation for 2D beam bending along the x axis is $$\frac{d^2 y}{dx^2} = \frac{M}{EI} \tag{1}$$

where:
M=applied bending moment
EI=the product of Young's modulus, E, and the moment of inertia, I For an arbitrary solution to the deformation of a floating beam one may apply either a Finite Element Model (FEM) or use an iterative numerical scheme to address the nonlinear relationship between the bending moment and the water being displaced locally. In general, the equation for the moment will have the form $$M = \rho g \delta_z \int_0^x yx\, dx \tag{2}$$

where:
M=moment,
ρg=weight of water per unit volume,
y=height above or below some reference level,
$\delta_z$=width of the beam, and
x=coordinate along the length of the beam.
The total weight of the displaced water, W, is given by $$W = \rho g \delta_z \int_0^x y\, dx \tag{3}$$

It is useful to parameterize y in terms of x if an analytical solution is to be obtained. Such a function should be symmetric around x=0, should have a slope equal to zero at x=0 and as x→∞, should have its maximum curvature at x=0, and should have its curvature go to zero as x→∞. Individual terms of a Fourier Series do not meet this stipulation and an expansion based on exponential terms of the form $y=y_0 e^{-\lambda x}$ will not be very useful, since the slope $$\frac{dy}{dx}$$

has a maximum value at x=0, rather than being equal to zero.

A Gram-Charlier expansion (similar to methods used for defining arbitrarily shaped functions in statistics in terms of their moments) contains a set of orthogonal functions that meet these constraints.

The Gram-Charlier (G-C) Series was selected because the elements of this orthogonal series each fit the appropriate boundary conditions for curvature, such that $$\frac{d^2 y}{dx^2} = -2\mu y_0 = \frac{M}{EI} = \max|_{x=0} = 0|_{x=\pm\infty} \tag{4}$$

and meets the requirement that the function be symmetric as well as the stipulation that the slope at x=0 is equal to zero, such that $$\frac{dy}{dx} = 0|_{x=0} = 0|_{x=\pm\infty} \tag{5}$$

Eqn. (4) has three unknowns, $\mu$, M, and $y_0$, needing at least two more independent equations for a solution. A typical Fourier Series approximation may be formulated using cosine terms only but each term would not go to zero at infinity. Approximations of the form $y=y_0 e^{-\lambda x}$ do not have zero slope at x=0. Thus, it appears that the first G-C term that may be used is the lowest order function satisfying the boundary conditions listed above under Eqn. (3).

The derivation is accomplished as follows. The form of the leading term in the G-C series is such that $$\frac{dy}{dx} = 0|_{x=0} \tag{6A}$$

$$\frac{d^2 y}{dx^2} = -2\mu y_0 = \frac{M}{EI} = \frac{2\rho g \delta_z \int_0^\infty (xy) dx}{EI} \tag{6B}$$

The relationship between the weight and the moment for the first G-C function is given by $$\frac{M}{W} = \frac{\int_0^\infty (xy) dx}{\int_0^\infty y dx} = \frac{1}{\sqrt{\mu\pi}} \tag{7}$$

Archimedes Principle dictates that the weight of the water displaced must equal the weight of the load, such that $$W = 2\rho g \delta_z \int_0^\infty y dx \tag{8}$$

This gives us three equations with three unknowns, from which straightforward algebra may be used to obtain a solution.

This series is an orthogonal expansion of the form $$f(x) = c_0 \Psi(x) + \frac{c_1}{1!} \Psi'(x) + \frac{c_2}{2!} \Psi''(x) + \ldots \tag{9}$$

where:

$$\Psi(x) = \frac{1}{\sqrt{2\pi}} e^{\frac{x^2}{2}} \tag{10}$$

Given the constraints listed above, only the even functions in this expansion will be non-zero for the floating beam solution. Furthermore, each term in this series meets the constraints on the slope and curvature at x equal to zero and infinity. Such a series can be written as $$y = \sum_{k=1}^{n} \lambda_k \exp(-\mu_k x^{2k}) \tag{11}$$

where the coefficients $\lambda_k$ and $\mu_k$ are coefficients that must be determined from mathematical and physical constraints on the system. Making the assumption that only the leading order of this expansion is useful yields $$y = y_0 e^{-\mu x^2} \tag{12}$$

where $y_0$ is the maximum displacement of the beam and $$\mu = \sqrt{\frac{\rho g \delta_z}{2EI}} \tag{13}$$

$$y_0 = \frac{W\sqrt{\mu}}{\rho g \delta_z \sqrt{\pi}} \tag{14}$$

These equations put the relationship into a usable form. The second derivative at x=0 is given by $$\frac{d^2 y}{dx^2} = -2\mu y_0 \tag{15}$$

Usually in function fitting with this class of series the first term picks up a very large percent of the variance, so this may be a satisfactory approximation for the idealized case. As an example, for a weight of 72 tons, a beam length of 24 feet, and an EI of $10^{10}/144$, where EI is in lb-ft$^2$ units, the maximum displacement is calculated to be 43.3 in. The form of these equations readily indicates how the various physical terms, such as weight, width, and EI, affect the solution. The solution has been derived formally for the case of load length approaching zero. Essentially, this can be shown to be equivalent to the case of a beam with zero buoyancy directly under the center of mass of the load and a displacement along the x axis approximately equal to $$\frac{\delta_x}{2},$$

where $\delta_x$ is the total load length. The estimates for $y_0$, however, may be reasonable estimates for this case.

A second assumption implicit in the solution above is that the length of the floating beam is infinite. This assumption may be negated in one of two ways. One method is to replace the integral limits of infinity used in the derivation above with an arbitrary value of x, say $$\frac{x_l}{2},$$

where $x_l$ is the length of the beam in the water. This leads to a solution that includes dependence on $\Phi(x)$, given by $$\Phi(x) = \int_0^x \Psi(x)dx \tag{16}$$

This equation, even though it is tractable, may be approximated by a series solution. A much simpler solution, which nonetheless is appropriate for relatively long beam lengths, is to use the infinite-length solution and modify the result to compensate for the imbalance in the buoyancy and load weight in the solution. As long as this is a small adjustment, it can be shown that its effect on the solution is also very small. In this case, a suitable estimate for the maximum displacement of a finite-length beam may be derived from the required adjustment, $\Delta y$, to the imbalance as $$y_0' = y_0 + \Delta y = y_0 + \frac{y_0[1 - \Phi(\mu x)]}{\delta_x \sqrt{\pi \mu}} \tag{17}$$

This is a simple function to either look up in a table or to estimate numerically. From some solutions with a typical EI for heavy loads, this approximation is accurate for causeways of at least 70' and may even be suitable for a 60' section.

In order to allow for the buoyancy under the load that is distributed over a distance $\delta_x$, replace the weight in the equation used for $y_0$, with W', such that $$y_0 = \frac{W'\sqrt{\mu}}{\rho g \delta_z \sqrt{\pi}} \tag{18}$$

where W' may be estimated from $$W' = W - \rho g \delta_z \delta_x y_0 \tag{19}$$

where:
$\delta_z$=distance along the z axis (width of the beam)

This leads to a solution for the actual maximum displacement, accounting for the buoyancy under the loaded distance, $\delta_x$, given by $$y_0 = \frac{WQ}{1 + \rho g \delta_z \delta_x Q} \tag{20}$$

where Q is given by $$Q = \frac{\sqrt{\mu}}{\rho g \delta_z \sqrt{\pi}} \tag{21}$$

Some results are shown in Table 2 below, where $EI_0$ is the initial value of EI for an "all-aluminum" structure.

TABLE 2

| | Predicted Maximum Displacement (in.) | | | | | |
|---|---|---|---|---|---|---|
| | $EI_0/10$ | | $EI_0$ | | $EI_0 * 10$ | |
| Length (ft) | 72 tons | 20 tons | 72 tons | 20 tons | 72 tons | 20 tons |
| 24 | 77 | 21 | 43 | 12 | 24 | 7 |
| 30 | 65 | 18 | 36 | 10 | 20 | 6 |

Using analytical equations to investigate the consequences of varying EI on both the freeboard and the force required to connect two sections of an embodiment of the present invention, such as a transportable causeway, a simple approximation to this force (tension) may be represented as $$T = \frac{M}{\delta h} \tag{22}$$

where $\delta h$ is the thickness of the deck section at the point of contact between two sections. The moment may be written as $$M = x_e W' \tag{23}$$

where $x_e$ is the effective moment-arm over which the weight, W', is applied. For the class of functions used, $x_e$ may be described using the relationship $$x_e = \frac{1}{\sqrt{\pi \mu}} = \left(\frac{EI}{\pi^2 \rho g \delta_z}\right)^{1/4} \tag{24}$$

which is an explicit function of known quantities.

Using these equations, the relationship between overall beam stiffness (EI), net displacement, and tension on connecting elements is established. As EI decreases, the displacement increases (freeboard decreases) and the tension decreases. FIG. 10 shows the net freeboard (in inches) remaining as a function of EI {in lb-ft²).

Figure 11:
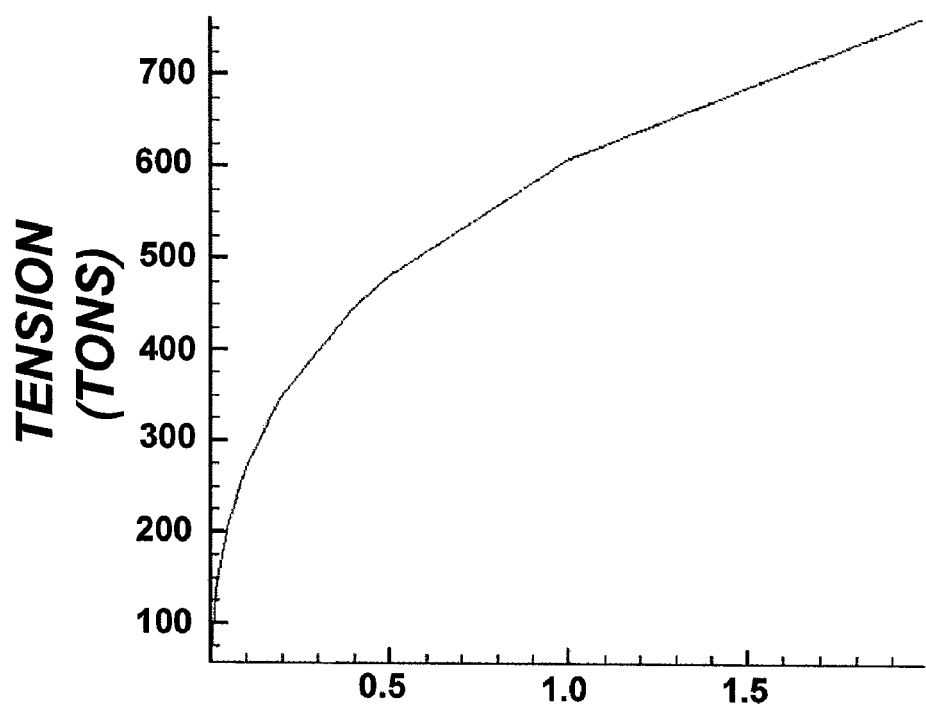
FIG. 11 is graph depicting the relationship of Tension to $EI \times 10^9$ for a representative embodiment of the present invention.

FIG. 11 shows the tension in the connecting elements, also as a function of EI. This estimate uses the relationship Freeboard=53 in.−displacement (in.)

when aluminum decks 102 and support structure yielding an 18 in. height and flotation cylinders 103 of 5 ft-diameter are employed.

This relationship adjusts for the rounded bottoms of the tubes 103 by converting to an equivalent-area rectangular shape (approximately 47" depth) plus an assumed approximately 6 inches of freeboard in the 18" of deck section 120, due to the combined weight of the section 120 and tubes 103 alone, before the tubes 103 are inflated. Results roughly correlate to those using an FEM.

The size of the flotation tubes 103 is relevant. The 53" offset in the freeboard estimate may be increased if larger tubes 103 are used. However, a potential disadvantage of larger tubes 103 is the reduction of the length of individual deck sections 120. That is, total deck length should equal the total diameters of the buoyant tubes 103 so that no gap exists between the tubes. For example, for a transportable causeway, a reduction of section width from 10' to 8' translates into more connection points and tensioning mechanisms and less length of causeway stored per linear foot of "folded" storage. However, an advantage of larger tubes 103 is an increase in reserve buoyancy. This introduces a "safety factor" to address a potential catastrophic failure in parts of the assembly, providing a longer time to reach critical loss of flotation. Thus a failure of one tube 103 may be addressed by adjacent tubes 103 having "excess" buoyancy.

Another possibility is to reduce displacement, i.e., increase the freeboard and reduce tension in the connections by increasing the depth of the deck 102 and support structure. One way to do this would be to unfold the bottom half of the deck 102 and support structure from the top half after unloading from storage. This would increase the complexity, however, since a means for hinging and then connecting the two pieces is necessary.

Assuming 10'-wide deck sections 120 are employed with two 5'-diameter tubes 103 each, the tension required to join sections 120 is well within the design load for commercially available straps 104, cables and ropes constructed of an HMF fabric, such as SPECTRA®, VECTRAN® or KEVLAR®, which, depending on size, have individual maximum working loads up to a range of 75-150 tons. In select embodiments of the present invention, the combined widths of the deck sections 120 become the length of the causeway. For wide loads, multiple deck sections 120 need be joined long side to long side to establish the width of the causeway. Thus, for example, two deck sections 120 that are 10'×10' would be joined side by side to establish 10 ft of length of a causeway that is 20' wide. Alternatively, a single module 120 that is 10' in length and 20' in width would make a 10' length of causeway that is 20' wide. Preferably, pre-stretched fabric ropes or straps 104 should be employed since they are more flexible than the non-stretched versions. Some amount of pre-tension is required in the straps 104 to initially join the deck sections 120. Typically, straps 104 are pre-tensioned to 10% of maximum expected tension. Further, the ends of each strap 104 need combine to take the total design load. For example, the U.S. Army design load for the section ends is approximately 400 tons. As a design exercise, using eight straps 104, four through the top of four main beams of the deck and four through the bottom of the four main beams 110, each strap rated at 75 tons yields 600 tons, a 50% safety factor. If one of the straps were to break, the capacity would still be 525 tons, well above the design load.

Consider that if individual "hard" connections were made between each section 120, e.g., through bolts, each connection would have to withstand this same load, as well as the corresponding compression at the top of the joint. The use of HMF straps 104, cables or ropes does not change the nature of the compressive loading, but does change two factors concerning the tension loading at the bottom of the deck section 120. First, only one location need be considered for load termination, compared to terminating the load locally on each deck section 120 with hard connections. Second, compliant connections employing HMF fabric components have considerably more "give" than hard connections. Hence, select embodiments of the present invention are able to be designed to withstand reasonably large overloads, such as large waves due to local explosions, storm waves penetrating harbors, large ship wakes, Sea States of level 3+, and the like.

A second approach to an analytical solution for a loaded floating beam, i.e., the length of the causeway section, can be derived as follows.

$$EI\frac{d^4 y}{dx^4} + \rho g a y = -p(x) \tag{25}$$

where:
ρ=liquid density
g=gravity
a=width of the beam along the water interface

The boundary conditions are:

Fixed: $y(0)=y'(0)=0$ or $y(L)=y'(L)=0$

Simple Support: $y(0)=y''(0)=0$ or $y(L)=y''(L)=0$

Free: $y''(0)=y'''(0)=0$ or $y''(L)=y'''(L)=0$ where x=0 is the left end, and x=L is the right end of the beam, with L=the total length of the beam, and a=the width of the beam.

Consider the solution consisting of a particular and homogeneous relationship $$y=y_p+y_{h1}+y_{h2} \tag{26}$$

where:
$y_p$=a particular solution
$y_{h1}$=a homogeneous solution to satisfy boundary conditions at x=0
$y_{h2}$=a homogeneous solution to satisfy boundary conditions at x=L For a concentrated load, or $p(x)=P\delta(x-\xi)$, the particular solution that has bounded values of deflection at infinity is given by $$y_p(x) = \frac{P}{8EIk^3} e^{-k|x-\xi|} \{\sin(k|x-\xi|) + \cos(k|x-\xi|)\} \tag{27}$$

where:

$$k = \frac{1}{\sqrt{2}} \left(\frac{\rho g a}{EI}\right)^{1/4} \tag{28}$$

and P is the weight of the load on the structure. Note that k is the wave number and it has units of length$^{-1}$.

The homogenous solution is obtained by satisfying boundary conditions at the ends, i.e., at x=0 and L. The general expression for the homogeneous solution is $$y_{h_1}(x)=e^{-kx}\{A \sin(kx)+B \cos(kx)\} \tag{29A}$$

$$y_{h_2}(x)=e^{-k(L-x)}\{C \sin(k(L-x))+D \cos(k(L-x))\} \tag{29B}$$

The constants A, B, C and D are determined to satisfy the boundary conditions as stated below Eqn. (25) above. This requires solving a 4×4 matrix. For special limiting cases, simplifications occur as discussed below.

Case 1: For kL>>1. This represents a very long structure, such as a military transportable causeway or bridge, or one that is very flexible so that k is large. In this case, the homogenous solution of Eqn. (29A) takes a simple form:

$$y_{h1}(x) = \begin{cases} -y_p(0)e^{-kx}\{\sin(kx) + \cos(kx)\} - \dfrac{y'_p(0)}{k}e^{-kx}\sin(kx), \text{ fixed} \\ -y_p(0)e^{-kx}\cos(kx) + \dfrac{y''_p(0)}{2k^2}e^{-kx}\sin(kx), \text{ simple support} \\ \dfrac{y''_p(0)}{2k^2}e^{-kx}\{\sin(kx) - \cos(kx)\} - \dfrac{y'''_p(0)}{2k^3}e^{-kx}\cos(kx), \text{ free} \end{cases}$$ (30A)

$$y_{h2}(x) = \tag{30B}$$

$$\begin{cases} -y_p(L)e^{-kx_L}\{\sin(kx_L) + \cos(kx_L)\} + \dfrac{y'_p(L)}{k}e^{-kx_L}\sin(kx_L), \text{ fixed} \\ -y_p(L)e^{-kx_L}\cos(kx_L) + \dfrac{y''_p(L)}{2k^2}e^{-kx_L}\sin(kx_L), \text{ simple support} \\ \dfrac{y''_p(L)}{2k^2}e^{-kx_L}\{\sin(kx_L) - \cos(kx_L)\} + \dfrac{y'''_p(L)}{2k^3}e^{-kx_L}\cos(kx_L), \text{ free} \end{cases}$$

where $x_L$=L−x.

Note: $y_p$ and its derivatives are known from Eqn. (27) and may be substituted into Eqns. (30A) and (30B).

The shear force, p(x), and bending moment, b(x), are obtained from the relationships $$p(x)=EIy'''(x) \tag{31}$$

$$b(x)=EIy''(x) \tag{32}$$

The location and magnitude of the shear force and bending moment are dependent on the location of the load on the structure and the boundary conditions.

When the load, e.g., a vehicle, is far from the boundary, i.e., kξ>>1 and k(L−ξ)>>1, then $$p_{max} = \frac{P}{2} \tag{33}$$

$$b_{max} = \frac{P}{4k} \tag{34}$$

Figure 12:
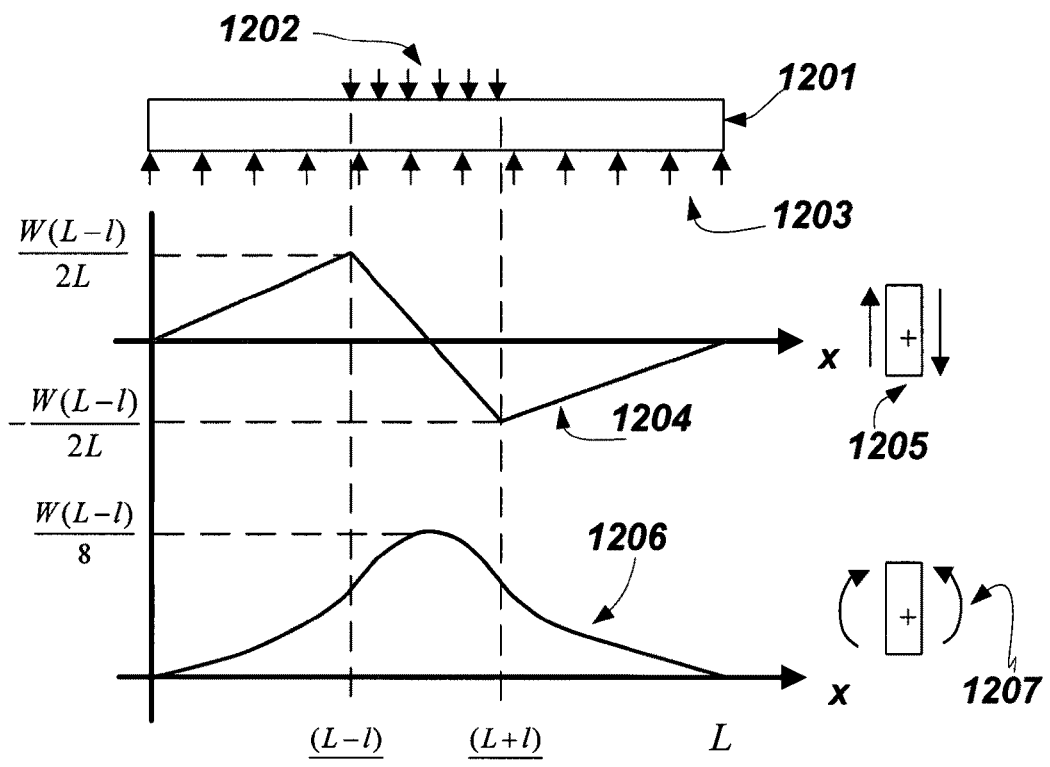
FIG. 12 graphically represents the relationships for bending moments and shear used in designing for a distributed loading of a representative embodiment of the present invention.
Figure 13:
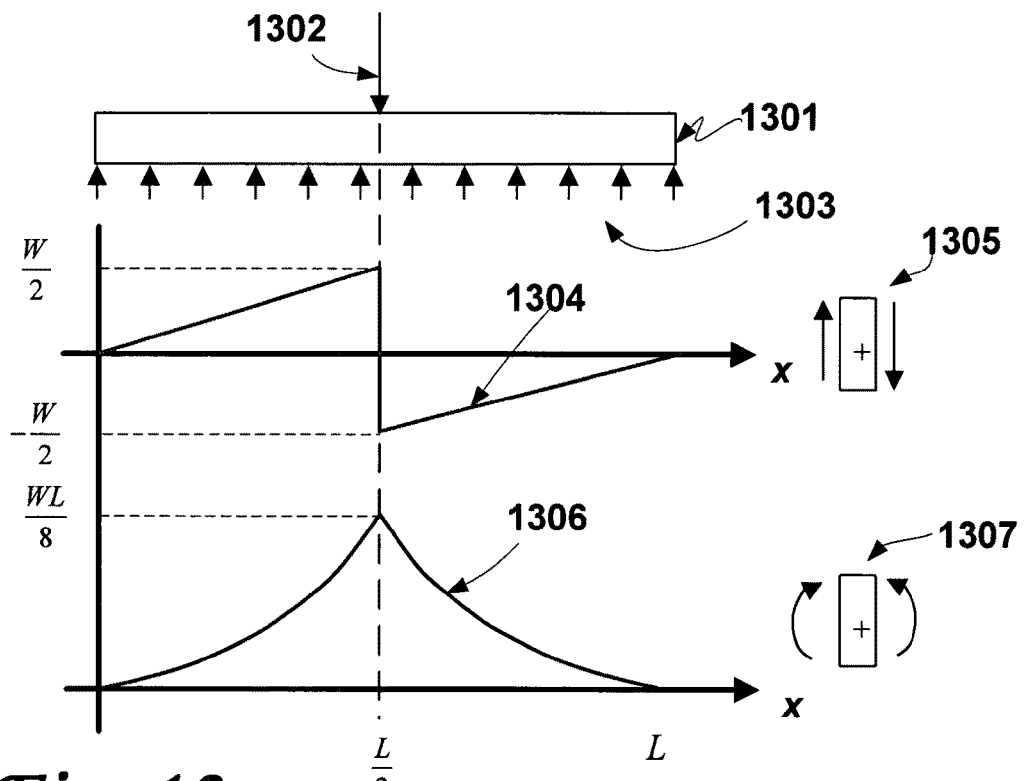
FIG. 13 graphically represents the relationships for bending moments and shear used in designing for a point loading of a representative embodiment of the present invention.

Case 2: Refer to FIGS. 12 and 13. For a short causeway or bridge where kL<<1. The structure may be treated as a rigid structure and may be assumed to be an approximately rigid body. Maximum shear force and bending moment for a rigid beam are shown below and apply to this case. This would be the case for kL<0.1, i.e., for L<70 ft. Use Eqns. (37), (38), (41) and (42) below for shear and bending moment estimates.

Refer to FIG. 12. When the beam 1201 is rigid or short enough, i.e., kL<<1, the beam 1201 can be approximated by a rigid bar with a uniformly distributed load 1202. In this case, the bending moment 1207 as shown in the graphed relationship 1206 and shear force 1205 as shown in the graphed relationship 1204 can be obtained from force equilibrium, thus for a uniform load 1202 at center resisted by a uniform buoyancy 1203:

$$p(x) = \frac{W}{l}, \frac{(L-l)}{2} < x < \frac{(L+l)}{2} \tag{35}$$

$$b(x) = \frac{W}{L}, 0 < x < L \tag{36}$$

such that $$p_{max} = \frac{W(L-l)}{2L} \tag{37}$$

$$b_{max} = \frac{W(L-l)}{8} \tag{38}$$

where:
W=load weight,
L=length of structure, and
l=length of load.

Refer to FIG. 13. For a "concentrated" load 1302 on the beam 1301, set l=0. For l=L, weight 1302 and buoyancy 1303 must balance each other so that W=B.

For a load 1302 concentrated at the center of the beam 1301, shear 1305 is $$p(x)=W\delta(x) \tag{39}$$

as shown graphically at 1304 and bending moment 1307 is $$b(x) = \frac{W}{L}, 0 < x < L \tag{40}$$

as shown graphically at 1306, that is, buoyancy 1303 is uniform and $$p_{max} = \frac{W}{2} \tag{41}$$

$$b_{max} = \frac{WL}{8} \tag{42}$$

APPENDIX B

Finite Element Modeling

Figure 14:
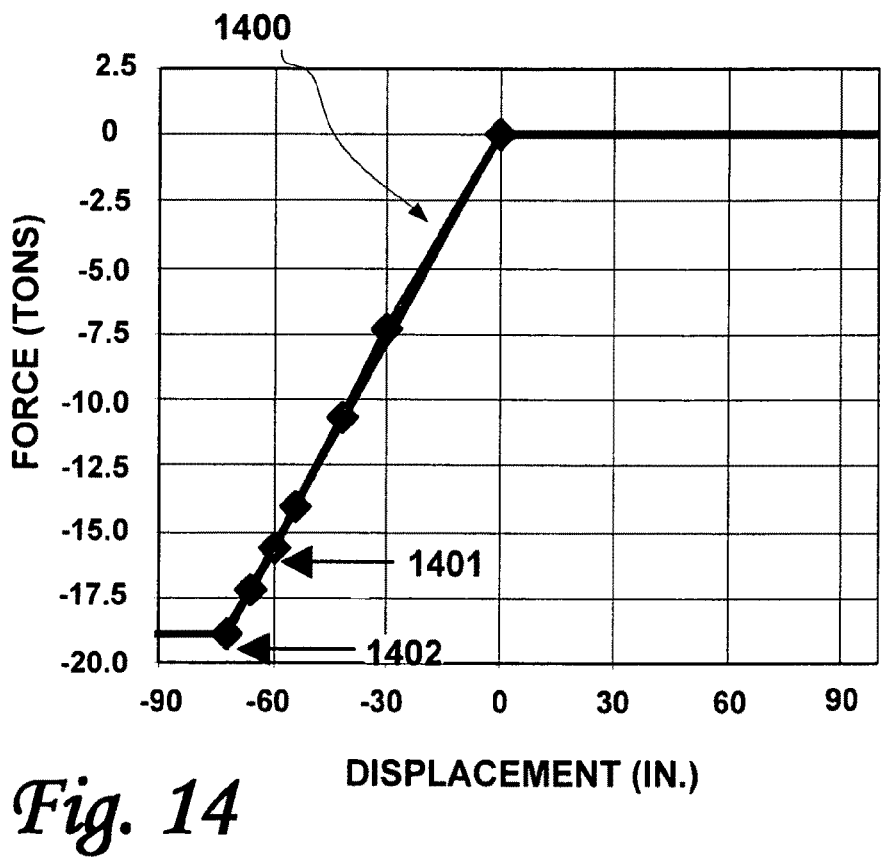
FIG. 14 is a graph depicting the relationship of Force to Displacement for a representative embodiment of the present invention.

Refer to FIG. 14. Modeling a flotation apparatus required a non-linear analysis. If a buoyancy tube is lifted out of the water, it exerts zero force on the apparatus. If the tube is completely submerged it exerts a constant force equal to the total available buoyancy force. Between these two extremes, the buoyancy function is reasonably approximated by a piecewise linear function. Note that under extreme loading, an embodiment of the present invention undergoes large deformations that lead to geometrically nonlinear behavior. In select embodiments of the present invention, the design basis relies on strap-stiffened joints that may introduce other nonlinear behavior. The primary facets of this are the joint deformations and the formation of gaps between sections.

During initial investigation, the finite element analysis (FEA) tool selected was NIKE3D. Puso, Michael A. et al., *NIKE3D, A Nonlinear, Implicit, Three-Dimensional Finite Element Code For Solid And Structural Mechanics User's Manual*, University of California, Lawrence Livermore National Laboratory, Report UCRL-MA-105268 Rev. 1., Livermore, Calif., February 2001. NIKE3D is a nonlinear implicit analysis code that has been used extensively to study the static, quasi-static, and dynamic response of structures undergoing finite deformations. NIKE3D is capable of modeling the deck structure, the buoyancy function, and the strap-stiffened system employed in embodiments of the present invention.

In addition to NIKE3D, ABAQUS® STANDARD is used as an additional analytical tool. ABAQUS® Standard, ABAQUS® Inc., Pawtucket, R.I., 2005. ABAQUS® STANDARD is a general-purpose implicit finite element code designed to solve traditional FE problems (static, dynamic, and thermal). It has a large library of elements and a wide array of contact and nonlinear material options. Additional elements, materials, and loading methods may be incorporated into the package through the use of user subroutines. ABAQUS® output is easily ported to several popular pre- and post-processing programs, including PATRAN, or it can be viewed in the ABAQUS® viewer.

Figure 15:
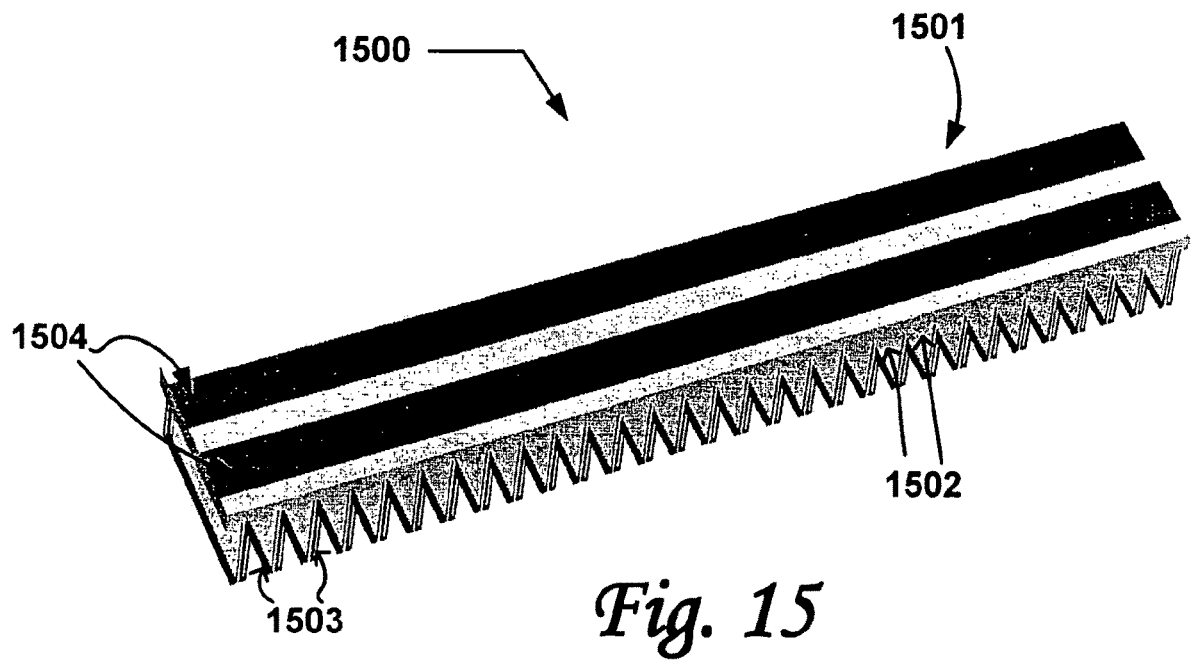
FIG. 15 represents the forces acting on an embodiment of the present invention as used in a computer model of an embodiment of the present invention.
Figure 29:
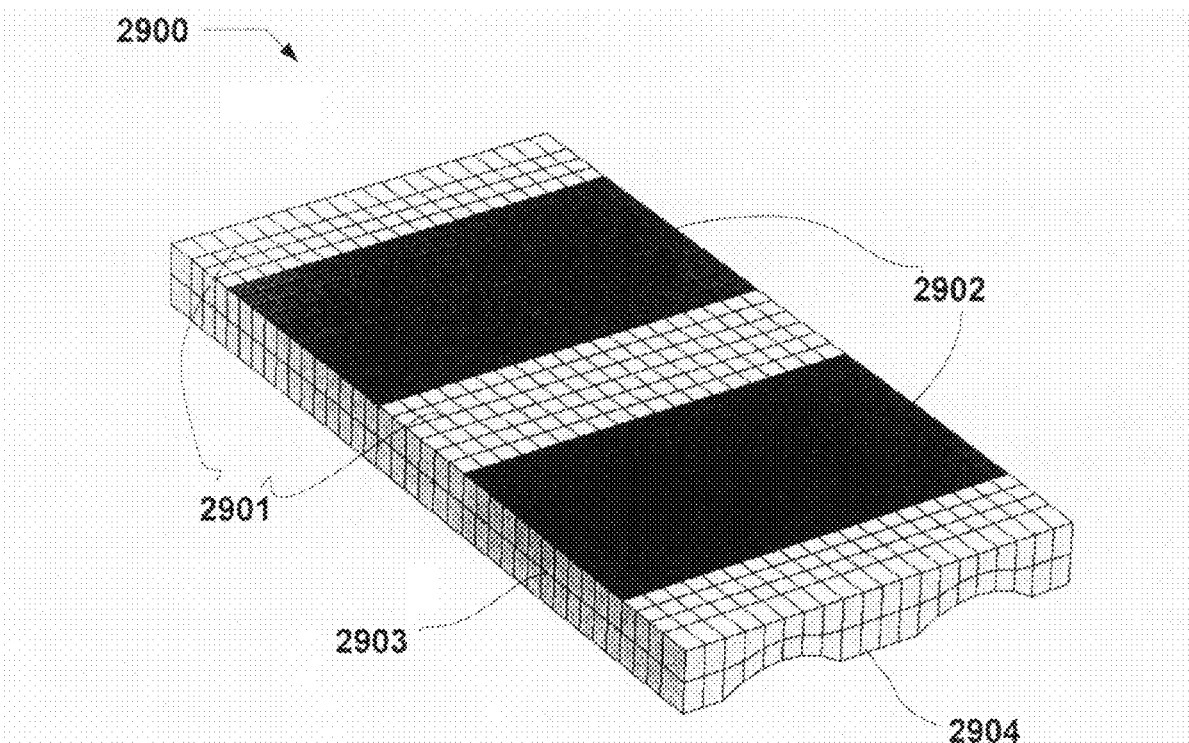
FIG. 29 is a 3D model built from shell elements for the deck structure as may be used to design an embodiment of the present invention.

Once a design cross-section has been established from the beam analysis results, a 3D finite element analysis may be used to determine detailed stress values and locations of any high stress regions. The 3D model makes it possible to analyze eccentric vehicle loads and lateral loads such as wind and currents. Refer to FIG. 29. The 3D model is built from shell elements for the deck structure (light 2901 and dark 2902 gray regions for the decking and medium tones for the ends 2903 and sides 2904). The dark gray areas 2902 are the allowable locations for placing vehicle tracks or wheels. The floats are modeled using spring elements defined by the function described in FIG. 15.

Figure 30:
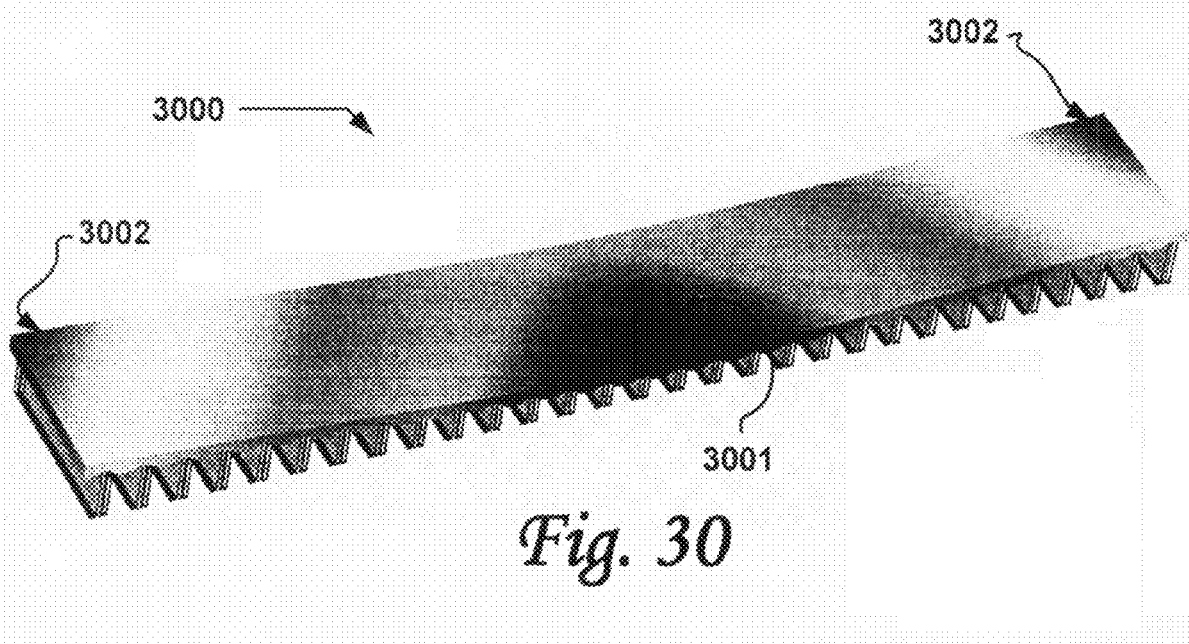
FIG. 30 is a representation of a computer-generated module with an eccentric load on a 150-foot causeway as may be used in designing an embodiment of the present invention.

An example of a modeled eccentric load is shown in FIG. 30, simulating a 150 ft causeway 3000. The center line of a heavy vehicle was shifted right 24 in. from the centerline of the causeway. The maximum displacement is the dark area 3001 near the center of the model 3000. The dark areas in the corners 3002 indicate the ends of the floats in this area are out of the water. This 150' causeway section 3000 maintains 24 in. of freeboard even with the eccentric load.

Figure 31:
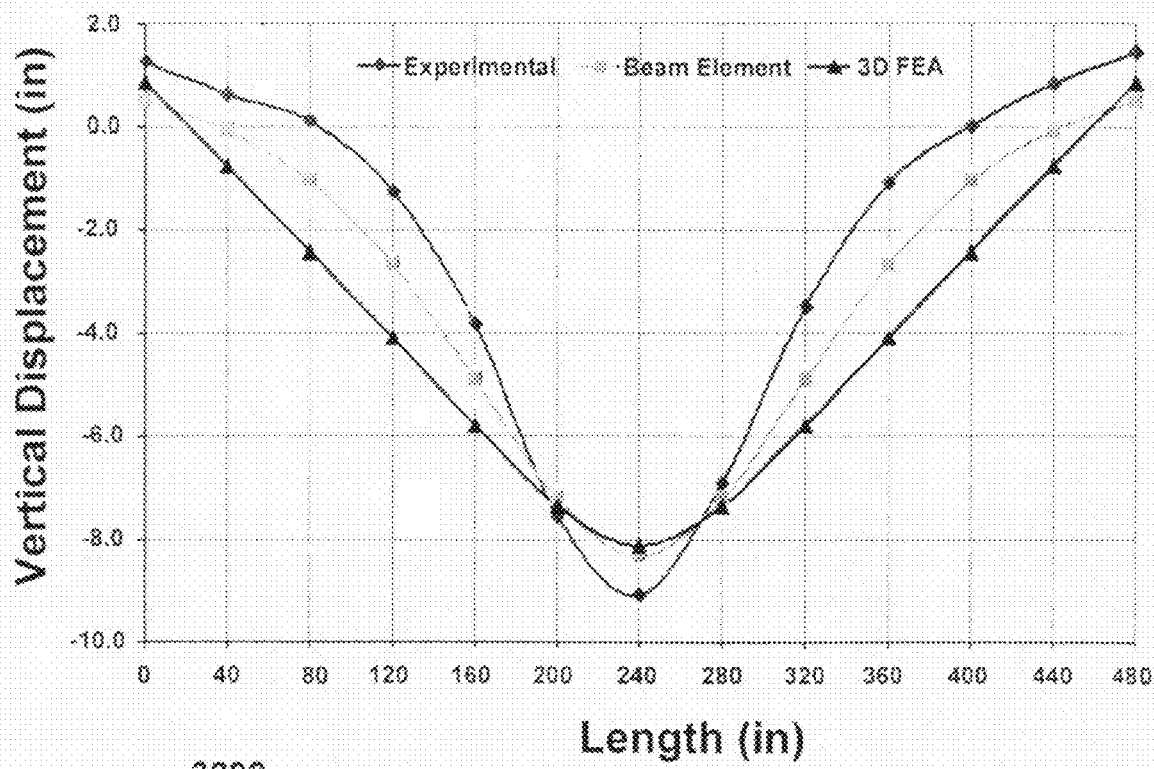
FIG. 31 is a graph depicting ⅓-scale displacement results for an experimental beam element analysis and a 3D Finite Element Analysis of a causeway made from twelve modules as may be used in designing an embodiment of the present invention.

The demonstration of a ⅓-scale model for a plausible full-scale design provided an opportunity to evaluate the accuracy of the analytical models. The graph in FIG. 31 shows the ⅓-scale displacement results for an experimental causeway, a beam element analysis, and a 3D FEA of a causeway made from 12 modules of 40 in. length each, i.e., a ⅓-scale model of a 120 ft causeway. The results show that both the beam element model and the shell element model (3D FEA) provide reasonable predictions of the maximum displacements under the load. The good agreement between the physical model and the finite element models provides strong support for the conceptual design basis for embodiments of the present invention. Both the computer models and the physical ⅓-scale model show that full-scale embodiments of the present invention are capable of supporting a main battle tank.

Figure 32:
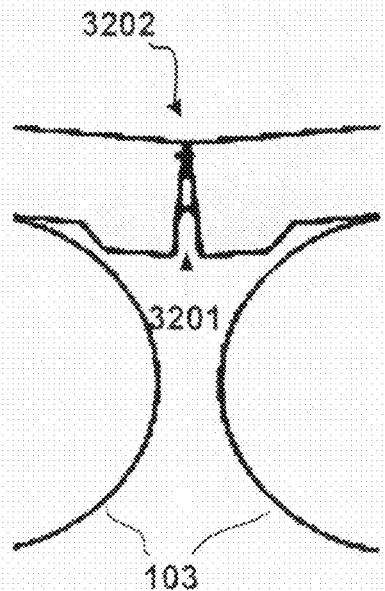
FIG. 32 is a photo depicting behavior of a joint between two sections carrying a load on a scale model of an embodiment of the present invention.
Figure 33:
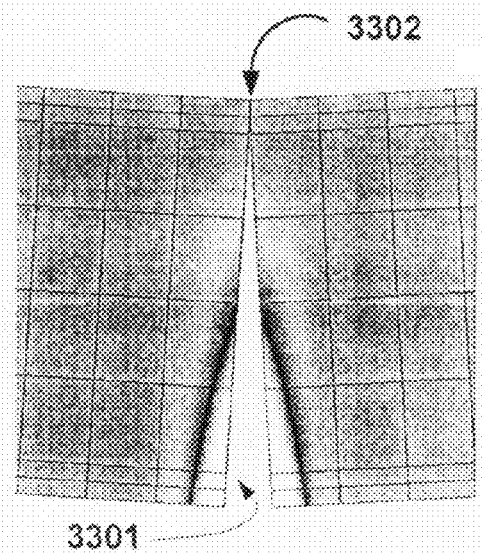
FIG. 33 depicts an example simulation for a symmetrically loaded joint showing the strap supporting the tensile force and the structure supporting the compressive force for both the model and the experimental unit depicted in FIG. 32.

Refer to FIG. 32, a line representation taken from a photo of a symmetrically loaded joint showing the gap 3201 at the bottom of the deck, indicating the straps 104 supporting the tensile force and the decking touching at the top of the deck 102. The straps 104 support the tensile force and the decking supports the compressive force. Refer to FIG. 33, an example of a simulation for a symmetrically loaded joint 3302 and resultant gap 3301 showing the strap 104 supporting the tensile force and the structure supporting the compressive force for both the model and the experiment unit of FIG. 32. In this case, the 3D model is simulating the actual behavior of the strap-stiffened joints between modules 120. LMCS™ behavior in this situation is quite complex and can include a gap 3201, 3301 opening and closing under load as shown in FIGS. 32 and 33.

APPENDIX C

Fundamentals of Scaling Relationships

The scaling relationships used for an undistorted hydraulic scale model of an embodiment of the present invention are provided below. A more formal and detailed discussion of the scaling laws can be found in the standard textbooks on this subject. Hudson, et. al., *Coastal Hydraulics Models*, 1979; Hughes, *Physical Models and Laboratory Techniques in Coastal Engineering*, 1993.

Beginning with the basic Froude relationship $$F_n = \frac{V}{\sqrt{gL}} \tag{43}$$

where:
$F_n$=First Froude Number;
V=Velocity (m/sec);
g=Gravity (m/sec$^2$);
L=Length (m), and
T=Time (sec).

Introducing the model-to-prototype geometric length ratio $$\frac{L_m}{L_p} = \lambda_r \tag{44}$$

Eqn. (44) is applied for geometric similitude. Equating the model-to-full scale Froude numbers ($F_{n(m)}=F_{n(f)}$) yields $$T_r = \lambda_r^{\frac{1}{2}} \tag{45}$$

where $T_r$ is the model-to-full scale time ratio. This is applied to meet the kinematic similitude requirements. For a dynamic similitude applying Newton's second law of motion $$F=ma \tag{46}$$

where:
F=force;
M=mass (M); and
a=acceleration (m/sec $^2$);

results in the force ratio $$F_r=\lambda^3 \gamma_r \tag{47}$$

where $\gamma_r$=specific gravity ratio between model and full scale (usually ignored since $\gamma_m \approx \gamma_f$). Thus, the loads or forces scale by the third power of the scaling ratio. Using Eqns. (43)-(47), one may derive all other scaling ratios for any other parameters. For example, the scaling factor for velocity or speed may be obtained from the ratio of length to time and from Eqns. (44) and (45), $$V_r = \lambda_r^{\frac{1}{2}}.$$

These and other pertinent scaling factors were used in the ⅓-scale physical model built to prove the concept of an embodiment of the present invention. Material properties did not affect the scaling because the same materials used in the full-scale version were also used in the physical model. In order to keep the equivalency in terms of strength between a full-scale version and the physical model, it was necessary to distort some of the geometric dimensions such as the cross-sectional area. For example, in the estimate of the EA parameter, that is effective tensile modulus, E, multiplied by the effective cross-sectional area, A, the values of E used were identical for the full-scale version and the physical model, and therefore A becomes the free parameter, or "tuning" variable, if necessary.

APPENDIX D

Tensioning System: Tensioning Requirements and Related Design Guidance

In select embodiments of the present invention, the design envisions an aluminum superstructure that uses synthetic high modulus fiber (HMF) straps 104 or flat cables as tension elements for connecting the modules 120 of the system. This modular connectivity ensures structural integrity while meeting performance requirements. A total of eight different HMF straps, a polyester strap, and a steel cable were tested for possible use in testing embodiments of the present invention.

Flat cables or straps of non-metallic construction, such as polypropylene, KEVLAR® and the like, fall into two general categories: high modulus (HM) and low modulus (LM). This classification is based on the tensile modulus of the fibers. LM polymers such as nylon and polypropylene have been excluded from consideration due to creep and elongation of 20-30%.

Polyester (PET) has been included as a benchmark even though it is LM and has become a viable alternative to steel cable in the deep-water petroleum industry. Design guidance for PET is available from the American Petroleum Institute (API) and American Bureau of Shipping (ABS), among others. Likewise, high carbon steel (HCS) cable has been included for comparison.

Four categories of polymer fibers used to make high strength flat cables (or ropes) for marine applications were considered. The first is Ultra High Molecular Weight Polyethylene (UHMWPE). Commercial products in this category include DYNEEMA®, DSM Corp., and SPECTRA®, Honeywell Corp. under license to DSM, a subsidiary of Allied-Signal. The second includes paraphenylenes in the category of aramids. These are available commercially as KEVLAR®, E.I. duPont de Nemours and Co., TECHNORA®, Twaron Corp., and ZYLON®, Toyobo Corp. The third are polyethylenes (PENs) commercially available from several vendors such as PENTEC®, licensed to Honeywell Corp. The last are polyester-polyarylates, or liquid crystal polymers (LCP), commercially available as VECTRAN®, Hoechst Celanese Corp. Table 3 shows the basic material properties of the high strength fibers, polyester (PET), and high-carbon steel (HCS).

TABLE 3

Strand Properties

| Material | Trade Name | Specific Gravity (g/cm³) | Tensile Modulus (psi, ×10⁶) | Tensile Strength (psi, ×10³) | Stretch (%) | Vendor |
| --- | --- | --- | --- | --- | --- | --- |
| UHMWPE | DYNEEMA ® | 0.98 | 12.9 | 390 | 3.0 | DSM |
| UHMWPE | SPECTRA ® | 0.98 | 9.7 | 440 | 4.5 | Honeywell |
| PPTA | KEVLAR ® | 1.44 | 8.4 | 420 | 3.7 | Dupont |
| PPTA | TECHNORA ® | 1.38 | 10.6 | 500 | 4.6 | Twaron |
| PBO | ZYLON ® | 1.56 | 40.0 | 540 | 2.5 | Toyobo |
| PET | Polyester | 1.38 | 2.0 | 170 | 14.0 | Honeywell |
| PEN | PENTEC ® | 1.38 | 4.4 | 160 | 6.0 | Honeywell |
| LCP | VECTRAN ® | 1.40 | 9.4 | 410 | 4.4 | Celanese |
| HCS | Steel | 7.86 | 29.0 | 310 | 1.2 | WRCA |

The tensile modulus and tensile strength values shown in Table 3 have been converted from the nomenclature commonly used in the fiber industry (specific strength and specific strength) to units of stress commonly used in structural mechanics.

Table 4 lists eight high strength fibers, a polyester strap, and a steel cable that are presently available domestically and manufactured from these materials. PEN-type fiber cables and ropes were not available domestically at the time of evaluation.

TABLE 4

Manufactured rope properties

| Rope | Construction | Supplier | Material | Effective Tensile Modulus (psi, ×10⁶) | Specific Gravity (g/cm³) |
| --- | --- | --- | --- | --- | --- |
| DYNEEMA ® | Single Braid Torque Free | Sampson Ropes | DYNEEMA ® SK-75 | 5.66 | 0.98 |

TABLE 4-continued

Manufactured rope properties

| Rope | Construction | Supplier | Material | Effective Tensile Modulus (psi, ×10⁶) | Specific Gravity (g/cm³) |
|---|---|---|---|---|---|
| SPECTRA ® | Single Braid Torque Free | Puget Sound | SPECTRA ® 900 | 4.89 | 0.98 |
| PLASMA ® | Single Braid Torque Free | Puget Sound | SPECTRA ® 900 | 7.24 | 0.98 |
| VECTRAN ® | Single Braid Torque Free | Puget Sound | VECTRAN ® | 5.71 | 1.40 |
| BOB ® | Single Braid Torque Free | Puget Sound | SPECTRA ® 900 (48%) VECTRAN ® (52%) | 8.15 | 1.18 |
| ZYLON ® | Double Braid Torque Free | Yale Cordage | ZYLON ® (56%) Polyester (44%) | 7.68 | 1.48 |
| TECHNORA ® | Double Braid Torque Free | Yale Cordage | TECHNORA ® (56%) Polyester (44%) | 3.88 | 1.40 |
| Polyester | Double Braid Torque Free | Sampson Ropes | Polyester/Polyester | 0.41 | 1.38 |
| Steel | 6 by 36 Torque | WRCA | IWRC/XXIP | 12.6 | 7.86 |
| KEVLAR ® | 3 or 4 Strand Torque | Whitehill | KEVLAR ® 29 | 2.90 | 1.44 |

The effective tensile modulus of high strength flat cables or ropes was determined from vendor pull tests obtained from the Puget Sound Rope Corp., Whitehill, Wash., and from the websites of Sampson Ropes, Yale Cordage, or personal communication (WRCA). For pull tests, the data are presented as load versus percent elongation. Some websites present these data as percent Mean Break Load (MBL) versus percent elongation. High strength flat cable or rope manufacturers conduct pull tests of their products in accordance with some criteria. For example, the Cordage Institute recommends testing for 10 cycles to 20% MBL followed by a pull test. This insures the constitutional stretch, i.e., "bedding in," is removed from the evaluation so that the modulus of the tested flat cables or ropes is representative of working conditions.

The nominal tensile modulus was derived from $$E = \frac{\Delta F}{\Delta \varepsilon A} \quad (48)$$

where:
E=effective tensile modulus;
ΔF=linear portion of force-elongation curve (or MBL for a particular flat cable or rope size times a linear fraction of MBL axis);
Δε=ε/L=fraction of the elongation axis corresponding to ΔF;
L=nominal length of the un-stretched test specimen; and
A=πD²/4, where D=nominal diameter of the rope.

In general, the pull tests are approximately linear above 5-20% MBL. It would be necessary to consider an approximately linear portion, or tangent modulus, of the load-elongation curve when determining a value of E. Note that Eqn. (48) may be written in terms of rope stiffness as $$K = \frac{EA}{L} = \frac{\Delta F}{\Delta \varepsilon L} \quad (49)$$

Figure 16:
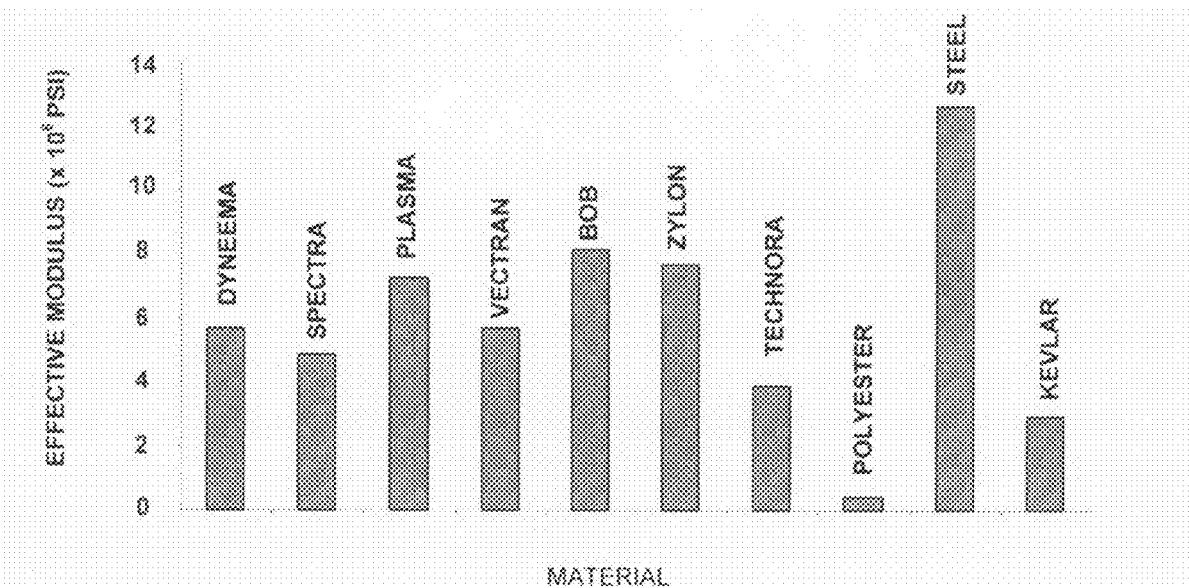
FIG. 16 shows the effective modulus for ten different materials that may be used to fabricate connection means between sections of an embodiment of the present invention, including polyester and steel.

FIG. 16 shows the effective modulus for the eight HMF fibers used in flat cables and ropes, the baseline polyester fiber and an HCS steel cable. In general, most of the HMF flat cables (straps) or ropes have a modulus in the range of 4-8× 10⁶ psi. These values are considered to be for a "worked" specimen, in turn providing a good estimate of the dynamic modulus, provided that the rope is not permitted to recover substantially prior to the pull test. The modulus so obtained should not be considered accurate for loadings below approximately 15% MBL. The effective modulus could be in a range as wide as 20-80% of the modulus shown in Table 4. For new material, the effective modulus may be 60-90% of the modulus shown in Table 4.

As can be seen from comparing Table 3 with Table 4, the effective modulus is significantly below the tensile modulus of the base fibers. There are several reasons for this, including:

use of a nominal diameter cannot account for a non-solid (fiber) cross-section, thus actual stress on the constituent fibers is higher;

the ropes have a pitch (helix angle), i.e., for braided ropes the various constituent "twines" pass over and under one another, thus the actual rope length is greater then the nominal length, resulting in a higher apparent strain rate;

the strain rate of a manufactured rope pull test is less than the strain rate of a fiber pull test; some visco-elastic behavior (creep) occurs relative to the fiber pull test resulting in a higher strain rate; and there may be some bias in the fiber manufacturer's modulus, e.g., selecting the steepest part of the fiber stress-strain curve.

Figure 17:
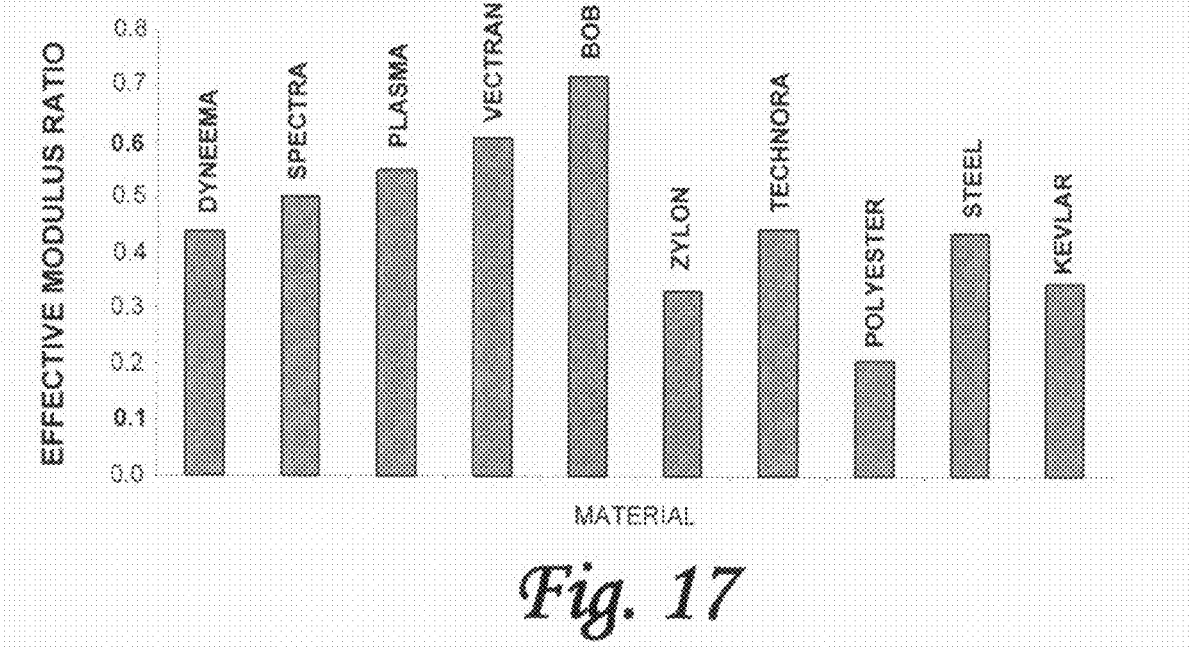
FIG. 17 shows the effective modulus ratio for ten different materials that may be used to fabricate connection means between sections of an embodiment of the present invention, including polyester and steel.

The issue is further complicated by the fact that no two manufacturers use the same criteria for pull tests, at least in regard to the load-deflection curves. Manufacturers use different cycles and percent of MBL for new or worked product. Regardless, the nominal diameter, i.e., area, is the metric used in structural engineering and is consistent when used to calculate strain, ε, given F, A, and E. FIG. 17 shows the ratio of effective modulus to fiber modulus for various HMF ropes, the baseline polyester rope, and HCS steel cable. All are higher than the baseline material and all but two are higher than or equal to the HCS steel cable.

The use of FIG. 17 may be marginally quantitative since the database is small (two samples/rope). However, FIG. 17 does suggest that use of a more "efficient" cross-section produces a higher effective modulus ratio. This is well known in the industry and has led to a first parallel construction type termed parallel strand where sub-filaments run parallel to the length of straps or a rope's axis. A second parallel construction type has the yarn bundles run parallel to the rope axis as parallel fibers. Parallel construction results in higher packing factors (theoretically up to 90% for hexagonally packed cylinders), largely eliminates the permanent stretch (negligible "bedding-in" factor resulting in approximately the same modulus for new or worked rope), has substantially better effective modulus in the 0-15% MBL range, and for a given mass results in an approximately 10-20% stronger rope when compared to braided construction.

Disadvantages of parallel construction for ropes and cables are the need for a protective cover or jacket to maintain structural integrity and some loss in axial compression, i.e., in "bend-over" sheave applications. These two disadvantages may be eliminated by using fiber strap or webbing constructions instead of ropes. The straps lose some packing efficiency due to transverse weave and lose some efficiency due to longitudinal weave geometry, i.e., straps are relatively thin and wide. Further, straps of HMF are available as COTS items primarily in KEVLAR®, although some companies custom manufacture HMF straps from any of the above materials except possibly PLASMA®.

Table 5 lists design parameters used in estimating cables, straps and ropes for sizing and elongation of a full size version and a ⅓-scale model.

TABLE 5

Design Criteria

| CRITERIA | FULL-SCALE | ⅓-SCALE MODEL |
|---|---|---|
| Working Load (lbs) | 1,250,000 | 46,300 |
| Factor of Safety | 2.0 | 2.0 |
| Design Load (lbs) | 2,500,000 | 92,600 |
| Conduits | 7 | 4 |
| Design Load/Conduit (lbs) | 357,000 | 23,100 |
| Rope Length (ft) | 60 | 20 |
| Length Distortion | 1 | 0.333 |
| Force Distortion | 1 | 0.037 |
| Modulus Distortion | 1 | 1 |
| Diameter Distortion | 1 | 0.192 |

The following scaling parameters were used to define the model length, force, modulus, and diameter distortion:

$$\Delta F_m = \lambda^3 \Delta F_f \quad (50)$$

where:
$\Delta F_m$=model rope tensile force;
$\Delta F_f$=full-scale version rope tensile force; and $$\lambda = \frac{L_m}{L_f} = 1/3$$

(geometric distortion between model and full-scale version length scales). Combining Eqns. (48) and (50):

$$\Delta \epsilon_m E_m A_m = \lambda^3 \Delta \epsilon_f E_f A_f \quad (51)$$

where the subscripts refer to model and full-scale version, respectively. By necessity $\Delta \epsilon_m \approx \Delta \epsilon_f$ otherwise the longitudinal model geometry would be distorted relative to the full-scale version geometry for any external load condition. Furthermore, the same material was used, therefore $E_m = E_f$. This choice appears to be appropriate since a model strap modulus $(E_m = \lambda E_f)$ does not exist and the creep properties of dissimilar materials may be substantially different. With these assumptions, Eqn. (51) reduces to $$A_m = \lambda^3 A_f \quad (52)$$

For a circular geometry, it is $$D_m = \lambda^{1.5} D_f \quad (53)$$

therefore a small geometric distortion is introduced relative to the normal geometric similitude of $D_m = \lambda D_f$. For a ⅓-scale physical model, the geometric distortion is 42%. In relation to inertia, loading and deflection characteristics, this distortion scale effect is small compared to the mass/geometry of the entire module.

A value of 2.0 for the factor of safety (FS) was assumed in the design of an embodiment of the present invention. This value is reasonable and correlates to structural steel building codes, e.g., FS=1.4 for dead loads, 1.7 for live loads, and a working stress ≈0.66 of yield stress. Similar FS values were used in the Navy lighterage design and these agree with a number of standards used in practice for PET lines. Palo, Paul, *Novel Fiber Rope Mooring System for Very Shallow Water Navy Lighterage*, 5th IRTW, Mar. 8-9, 2004, 28 pp; Lee M.-Y. et al., *Development of API RP 2SM for Synthetic Fiber Rope Moorings*, Offshore Technology Conference, OTC 12178, 2000, 9 pp. The American Petroleum Institute (API) recommends a value for FS of 1.67, the American Bureau of Shipping (ABS) and Det Norsk Veritas (DNV) both recommend a value of 1.82, Bureau Veritas (BV) recommends a value of 2.10, and Petrobras recommends a value of 2.09.

Given a design load, selecting the proper strap or rope type, i.e., diameter, width, thickness, and the like may be done using either the Minimum Breaking Strength (MBS) or the Minimum Tensile Strength (MTS). Table 6 lists physical characteristics of the eight HMF types, the baseline polyester, and the HCS steel, based on a design load for the ⅓-scale physical model.

TABLE 6

Rope properties for a design load of 23,100 lbs for a physical ⅓-scale model.

| Rope | Diameter (in) | Equiv. Diameter (in) | Weight (lb/ft) | Packing Coeff. (%) | Breaking Strength (lbs) | Yield Stress (psi) | Actual Stress (psi) | Stretch (%) | Cost ($/ft) |
|---|---|---|---|---|---|---|---|---|---|
| DYNEEMA ® | 0.500 | 0.378 | 0.064 | 76.8 | 30600 | 155845 | 117893 | 2.08 | 2.45 |
| SPECTRA ® | 0.625 | 0.472 | 0.106 | 81.4 | 36600 | 119297 | 75451 | 1.54 | 2.66 |

TABLE 6-continued

Rope properties for a design load of 23,100 lbs for a physical ⅓-scale model.

| Rope | Diameter (in) | Equiv. Diameter (in) | Weight (lb/ft) | Packing Coeff. (%) | Breaking Strength (lbs) | Yield Stress (psi) | Actual Stress (psi) | Stretch (%) | Cost ($/ft) |
|---|---|---|---|---|---|---|---|---|---|
| PLASMA ® | 0.500 | 0.378 | 0.064 | 76.8 | 31300 | 159410 | 117893 | 1.63 | 1.92 |
| VECTRAN ® | 0.500 | 0.378 | 0.092 | 77.2 | 31300 | 159410 | 117893 | 2.06 | 3.19 |
| BOB ® | 0.625 | 0.472 | 0.135 | 86.1 | 51400 | 167538 | 75451 | 0.93 | 5.54 |
| ZYLON ® | 0.438 | 0.331 | 0.065 | 67.4 | 24000 | 159649 | 153982 | 2.00 | 5.95 |
| TECHNORA ® | 0.625 | 0.472 | 0.108 | 58.0 | 34000 | 110823 | 75451 | 1.94 | 5.02 |
| Polyester | 1.000 | 0.756 | 0.271 | 57.7 | 33300 | 42399 | 29473 | 7.15 | 2.10 |
| Steel | 0.500 | 0.378 | 0.460 | 68.8 | 29200 | 148714 | 117893 | 0.94 | 4.10 |
| KEVLAR ® | 0.625 | 0.472 | 0.112 | 58.5 | 30000 | 97785 | 75451 | 2.60 | 3.21 |

Table 7 provides particulars for a full-size design load. In both Tables 6 and 7, the yield stress is the breaking strength divided by A, and the actual stress is design load divided by A. These values correspond to the equivalent diameter as affected by the packing coefficient. In Tables 6 and 7, the packing coefficient is the ratio of an equivalent solid area of rope divided by A. The stretch (elongation) is calculated using Eqn. (48). The costs are 2005 vendor quotes based on 180 ft of rope sized for the ⅓-scale physical model.

exercise for the ⅓-scale model. Note that PLASMA® costs less than the baseline polyester, and all but three of the eight HMF ropes cost less than the HCS steel cable.

Figure 22:
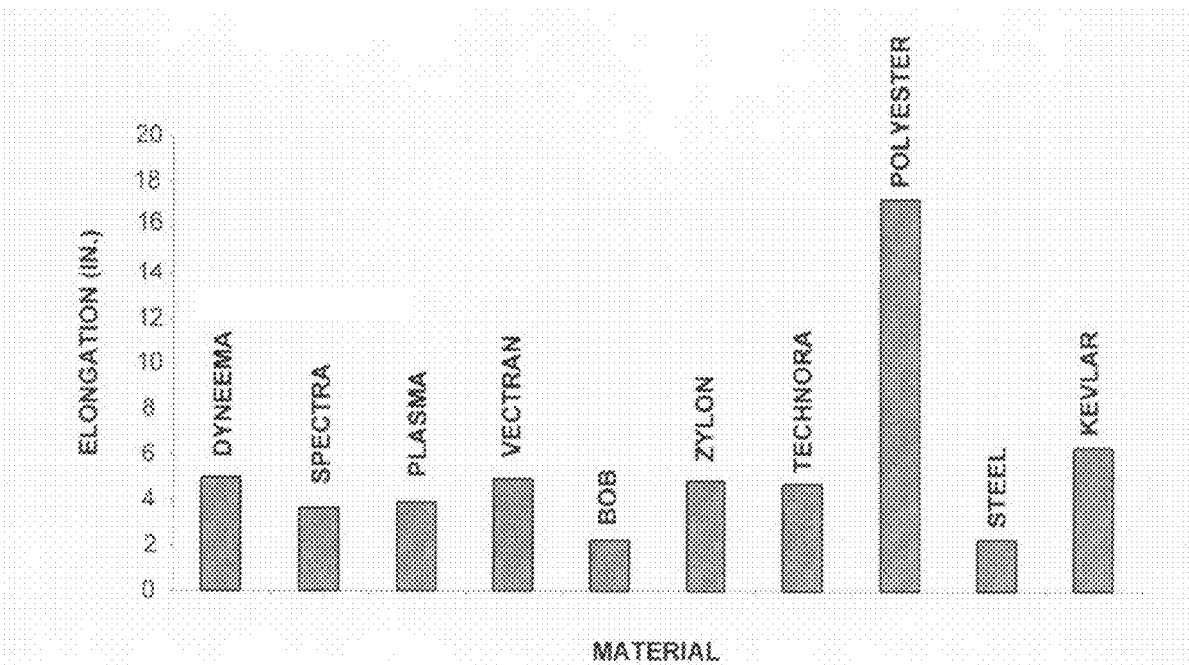
FIG. 22 shows the elongation of each of ten different materials that may be used to fabricate connection means between sections for a ⅓-scale embodiment of the present invention, including polyester and steel.

FIG. 22 shows the stretch (elongation) for the eight HMF ropes, the baseline polyester rope and the HCE steel cable used in the design exercise for the ⅓-scale model. BOB® equaled the HCS steel cable while all of the HMF ropes greatly exceeded the performance of the baseline polyester rope.

TABLE 7

Rope properties for a design load of 357,000 lbs

| Material | Diameter (in) | Equiv. Diameter (in) | Weight (lb/ft) | Packing Coeff. (%) | Breaking Strength (lbs) | Yield Stress (psi) | Actual Stress (psi) | Stretch (%) |
|---|---|---|---|---|---|---|---|---|
| DYNEEMA ® | 2.125 | 2.125 | 1.090 | 72.4 | 411000 | 115887 | 100701 | 1.78 |
| SPECTRA ® | 2.500 | 2.500 | 1.480 | 71.0 | 360000 | 73339 | 72757 | 1.49 |
| PLASMA ® | 2.125 | 2.125 | 1.090 | 72.4 | 428000 | 120680 | 100701 | 1.39 |
| VECTRAN ® | 2.125 | 2.125 | 1.570 | 73.0 | 428000 | 120680 | 100701 | 1.76 |
| BOB ® | 2.125 | 2.125 | 1.466 | 80.8 | 428000 | 120680 | 100701 | 1.24 |
| ZYLON ® | 2 × 1.250 | 1.768 | 0.462 | 58.7 | 181000 | 147492 | 145513 | 1.89 |
| TECHNORA ® | 4 × 1.250 | 2.500 | 0.510 | 68.5 | 108000 | 88006 | 72757 | 1.88 |
| Polyester | 4.000 | 4.000 | 5.250 | 69.9 | 399500 | 31791 | 28421 | 6.90 |
| Steel | 2.000 | 2.000 | 7.390 | 69.1 | 434000 | 138146 | 113682 | 0.90 |
| KEVLAR ® | 2.625 | 2.625 | 2.100 | 62.2 | 420000 | 77607 | 65992 | 2.28 |

Note that for the ropes used for the ⅓-scale physical model the Braid on Bending (BOB®) rope has a minimum available diameter of 0.625 in. so that it exceeds design specifications. Similarly, for the ropes used in the full scale design, the maximum available diameter for the ZYLON® and TECHNORA® ropes is 1.25 in.

Figure 18:
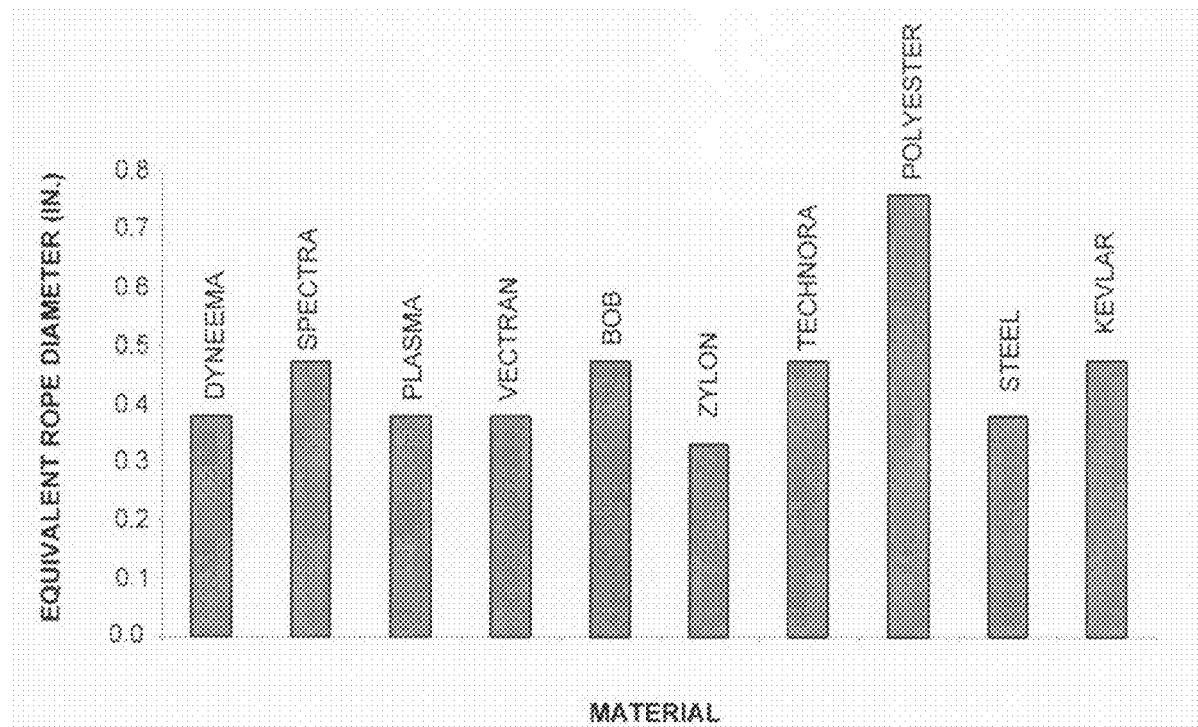
FIG. 18 shows the equivalent rope diameter for ten different materials that may be used to fabricate connection means between sections of a ⅓-scale embodiment of the present invention, including polyester and steel.

FIG. 18 displays the equivalent diameters for the eight HMF ropes, the baseline polyester rope and the HCE steel cable used in the analysis of the ⅓-scale model.

Figure 19:
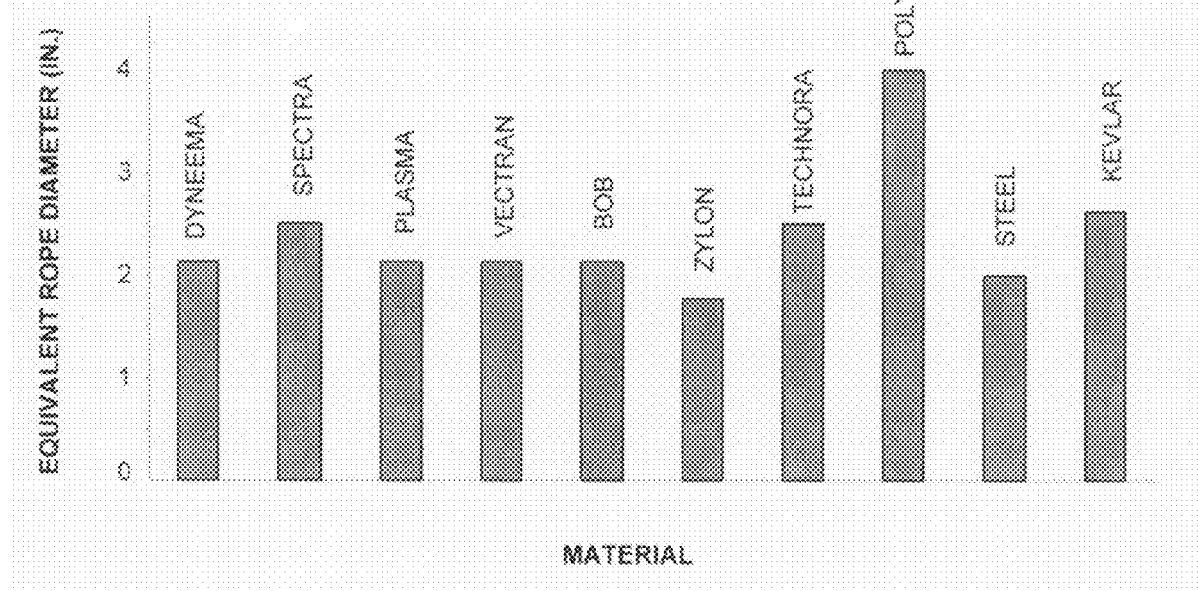
FIG. 19 shows the equivalent rope diameter for ten different materials that may be used to fabricate connection means between sections of a full-scale embodiment of the present invention, including polyester and steel.

FIG. 19 shows the equivalent diameters for the eight HMF ropes, the baseline polyester rope and the HCE steel cable used in the full scale prototype.

Figure 20:
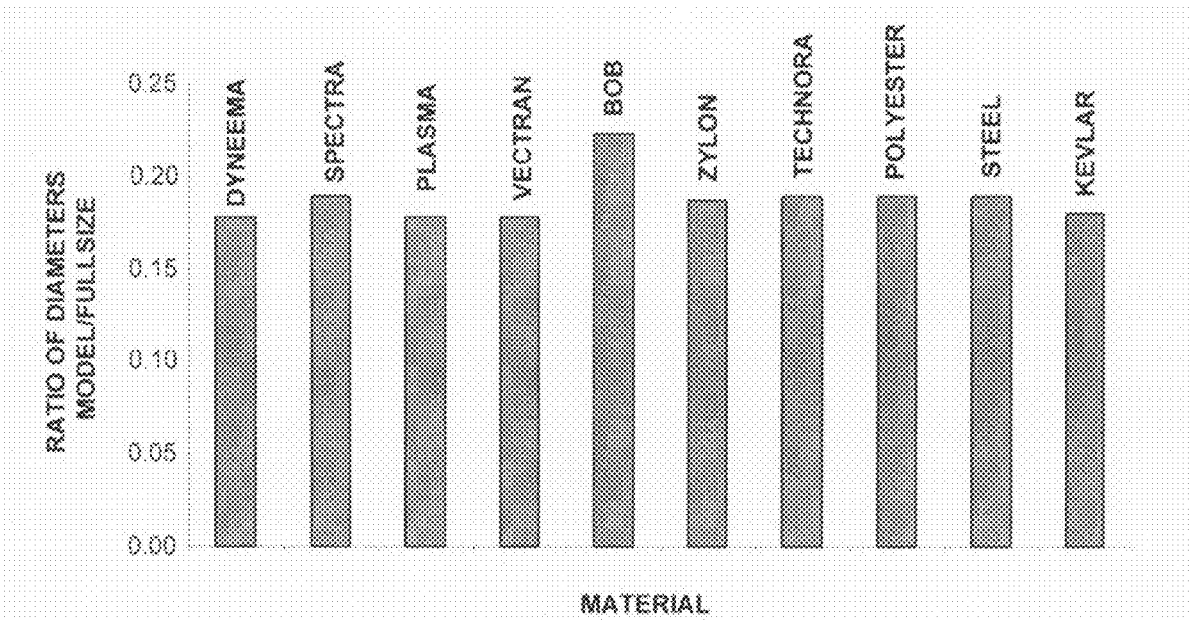
FIG. 20 shows the ratio of equivalent rope diameters, ⅓-scale to full-scale, for the materials of FIGS. 18 and 19.

FIG. 20 depicts the ratio of ⅓-scale model to full scale prototype equivalent diameters, which may be used to see if the diameter scaling relationship is valid. Only the BOB® rope appears to be out of line in this regard, perhaps because it was available only in an "oversize" version for the ⅓-scale model. As can be seen in FIG. 20, the equivalent diameter ratio is in good agreement with $\lambda^{1.5} = 0.192$.

Figure 21:
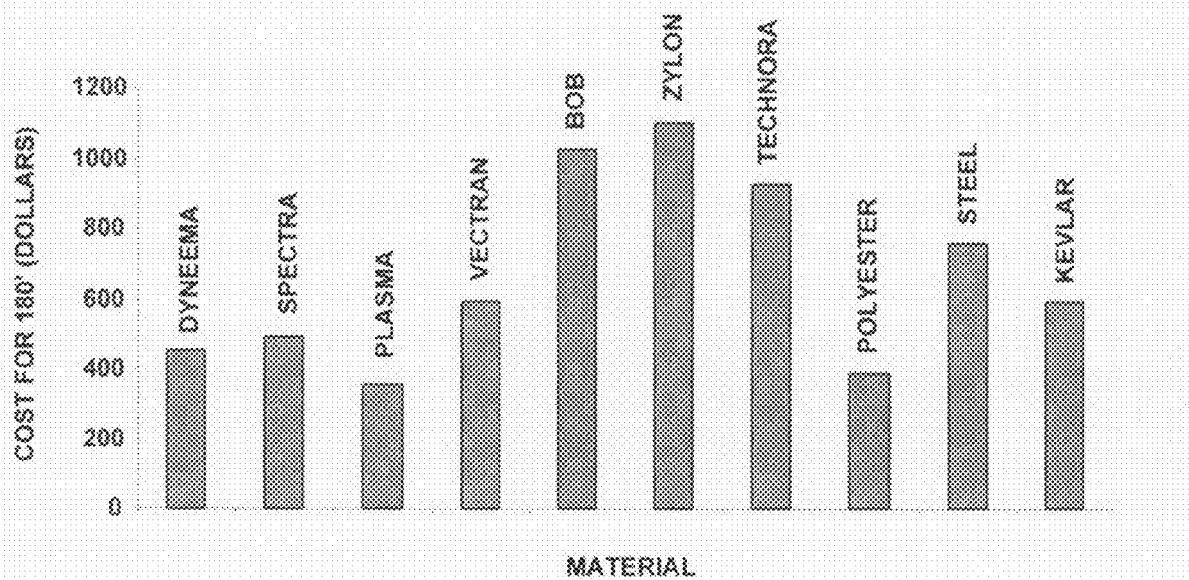
FIG. 21 shows the cost for 180 feet of each of ten different materials that may be used as connection means between modules of a ⅓-scale embodiment of the present invention, including polyester and steel.
Figure 23:
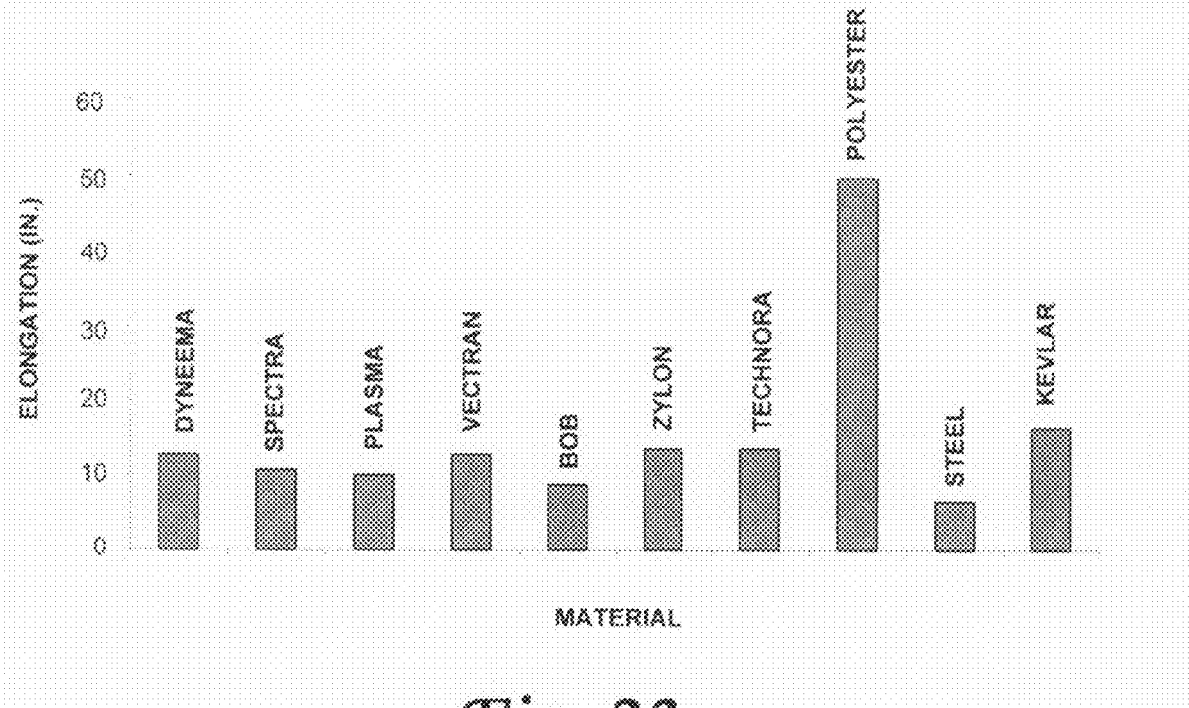
FIG. 23 shows the elongation of each of ten different materials that may be used to fabricate connection means between sections for a full-scale embodiment of the present invention, including polyester and steel.

FIG. 21 shows the cost for the eight HMF ropes, the baseline polyester rope and the HCE steel cable used in the design FIG. 23 compares the stretch (elongation) for the eight HMF ropes, the baseline polyester rope and the HCE steel cable used in the design exercise for the full scale version. Again, BOB® was closest to the performance of the HCS steel cable while all of the HMF ropes greatly exceeded the performance of the baseline polyester rope.

Figure 24:
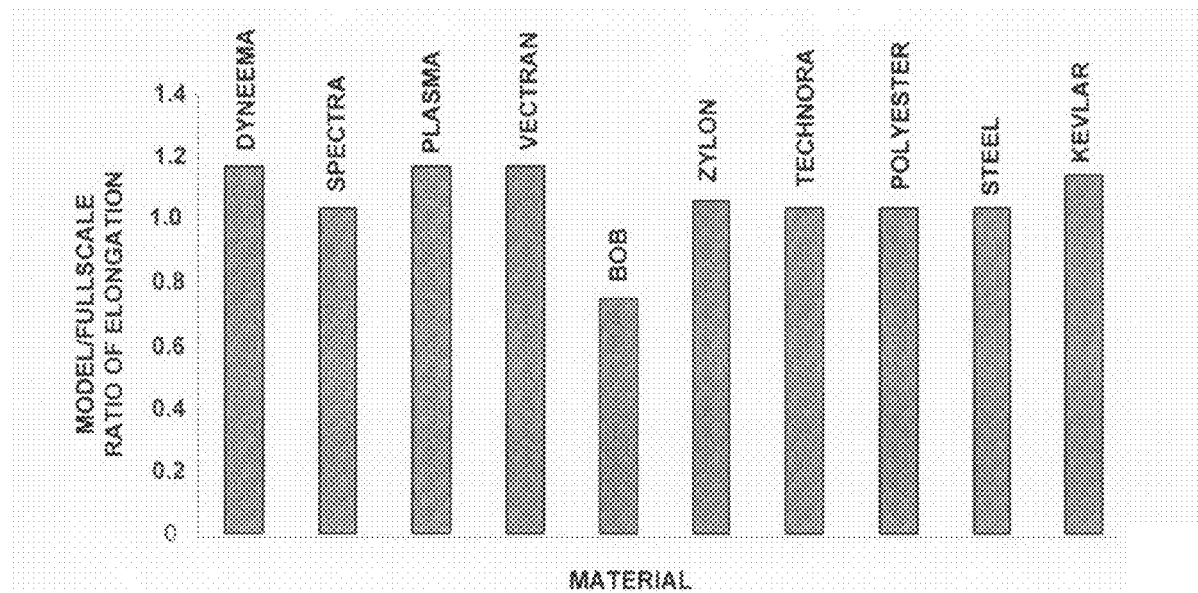
FIG. 24 shows the ratio of elongation, ⅓-scale to full-scale, for each of the ten different materials of FIGS. 22 and 23.

FIG. 24 shows the ratio of ⅓-scale model to full scale version percent stretch (elongation), i.e., the percent stretch ratio which ideally should be 1. FIG. 24 shows that the percent elongation ratio is in good agreement with unity. Again, the BOB® rope is below 1.0 due to the minimum size available. These results are in agreement with the scaling relationships used in Eqns. (50), (51), and (53).

One interesting factor shown in Tables 6 and 7 is that the yield stresses for the large diameter ropes used for the full scale design are 5-40% proportionally less than for the small diameter ropes used for the ⅓-scale physical model design.

Figure 25:
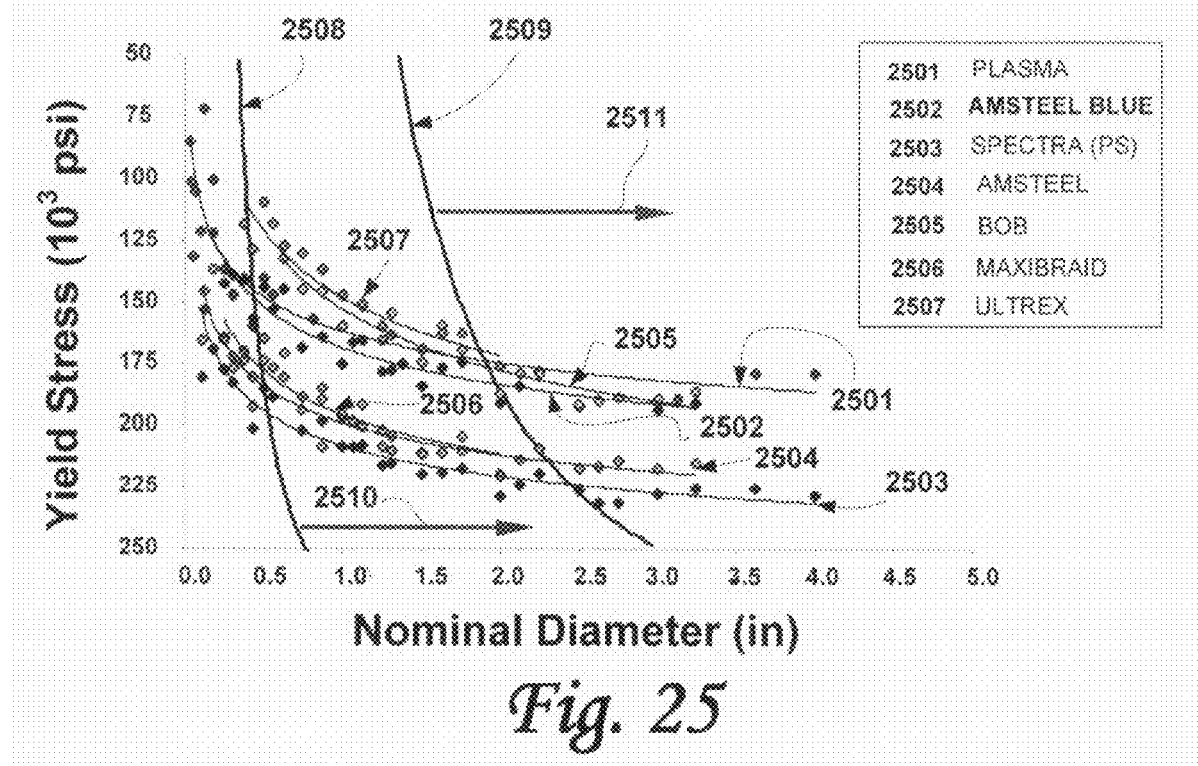
FIG. 25 depicts the relationship between yield stress and nominal rope diameter for a class of seven materials that may be used to fabricate connecting means used in embodiments of the present invention.

FIG. 25 graphs the relationship of yield stress versus nominal diameter for a selection of seven UHMWPE ropes, PLASMA® 2501, AMSTEEL BLUE®, 2502, SPECTRA® (PS) 2503, AMSTEEL® 2504, BOB® 2505, MAXI-BRAID® 2056, AND ULTREX® 2507. These plots were constructed from data obtained from several manufactures.

The overlaid curve 2508 indicates the minimum diameter of the ropes suitable for use with the ⅓-scale model, any size to the right, as indicated by the arrow 2510 being suitable. The second overlaid curve 2509 indicates the minimum diameter of the ropes suitable for use with a full-scale version, any size to the right, as indicated by the arrow 2511 being suitable.

We claim:

1. A compliant transportable flotation system for supporting individual items up to approximately 80 tons in a fluid, said system comprising:
    sections having a top, a bottom, two sides and two ends, said top parallel to said bottom, said sides parallel one to the other and said ends parallel one to the other, comprising:
        decking affixed to at least said top of said sections;
        decking support having at least a top and a bottom, said decking support in operable communication with at least said decking;
        slidable connectors to facilitate affixing each said section to an adjoining said section at said top of each said adjoining section,
    wherein said slidable connectors further facilitate the use of a tensioning device; and
        at least two inflatable devices in operable communication with said bottom of each said section, said inflatable devices oriented approximately perpendicular to the resultant length of said system,
    wherein said transportable flotation system is supported in compression by at least said decking and said decking support structure; and
    at least one flexible fabric configuration for connecting one said section to an adjoining said section, said flexible fabric configuration in operable communication with at least said slidable connectors;
wherein a first said end of a first said section is connected to a first said end of a second said section via said slidable connectors and said fabric configuration, and
wherein said fabric configuration is tensioned in place via said slidable connectors, and
wherein each said at least one fabric configuration is in operable communication with two said sections for the purpose of supporting said sections in tension, and
wherein said system may be deployed in conditions up to at least sea state 3.

2. The system of claim 1 in which said system is configured multiple six-section packages for transport and storage,
    wherein said six-section packages are stored spatially efficiently, each six-section package assembled by placing each said bottom of two sections together to create a pair and positioning two said pairs of said sections together and internal to said package, one section positioned with said bottom side adjacent each side of said internal pairs to create said six-section package, thus protecting said inflatable devices from environments external to said system when in storage and transit,
    wherein said system may be assembled using Commercial Off-The-Shelf (COTS) equipment and tools, and
    wherein said system may be assembled from a position on top of said sections as initially deployed in said fluid.

3. The system of claim 1 in which each said section further comprises decking affixed to said bottom of said decking support.

4. The system of claim 3 in which said decking support comprises:
    at least two first box beams, each said first box beam defining at least a portion of said sides,
    wherein at least one each said first box beams define a lowest portion of each said side of said section, and
    wherein the shape of the bottom of each said first box beam defining a lowest portion of each said side of said section further accommodates the positioning of said inflatable devices;
        at least two cross members, each said cross member having two ends, each said end of said cross member in operable communication with one of two said first box beams and approximately perpendicular to each said first box beam to form at least one rectangular frame,
    wherein said cross members define at least one cavity bounded by said first box beams, said cross members and said top and bottom decking, and
    wherein said cavity may be filled with foam to increase the buoyancy of said system.

5. The system of claim 4 in which each at least two said cross members are box beams comprising at least a portion of each of said ends of said sections.

6. The system of claim 4 in which each said side of said section further comprises at least one second box beam in operable communication with said first box beam, wherein said second box beam is positioned above said first box beam to increase the freeboard of said section.

7. The system of claim 1 in which each said inflatable device is a cylinder with major axis at approximately right angles to said sides of said section and said major axis approximately parallel to said ends of said section,
    wherein said inflatable device may be deflated for storage and transport of said system.

8. The system of claim 1 in which said flexible fiber configurations comprise configurations constructed of high modulus fibers (HMF).

9. The system of claim 8 in which said flexible fiber configurations are selected from the group consisting of straps, ropes, cables, and combinations thereof.

10. A compliant transportable flotation system for supporting conveyances above a fluid, said system comprising multiple sections each said section having a top incorporating at least decking, a bottom, two sides and two ends, said top parallel to said bottom, said sides parallel one to the other and said ends parallel one to the other, each said section connected one to another via slidable connectors wherein said slidable connectors that facilitate the use of a tensioning device, said slidable connectors provided at each end of said top of each said section and flexible fabric coupling elements in operable communication with said slidable connectors, said coupling elements selected from the group consisting of straps, ropes, cables and combinations thereof, each said section further comprising at least two inflatable devices in operable communication with said bottom of said section, said inflatable devices oriented approximately perpendicular to the resultant length of said system,
    wherein each said coupling element is tensioned prior to use of said system, and wherein each said flexible fabric coupling element is in operable communication with at least two said sections for the purpose of supporting said sections in tension, and wherein said transportable flotation system is supported in compression by at least said decking and said decking support, and
    wherein said system may be deployed in conditions up to at least sea state 3.

11. The system of claim 10 in which said system is configured in six-section packages for transport and storage,
    wherein said sections are stored spatially efficiently as multiple said six-section packages by assembling individual said six-section packages by placing each said bottom of two sections together to create a pair and positioning two said pairs of said sections together and internal to said package, one section positioned with said bottom side adjacent each side of said internal pairs to create said six-section package, thus protecting said inflatable devices from environments external to said system when in storage and transit, wherein said system may be assembled using Commercial Off-The-Shelf (COTS) equipment and tools, and wherein said system may be assembled from a position on top of said sections as initially deployed in said fluid.

12. The system of claim 10 in which each said section further comprises at least support structure having at least a top in operable communication with a bottom of said support structure and at least decking affixed to said support structure at said bottom of said support structure.

13. The system of claim 12 in which said decking support comprises:

at least two first box beams, each said first box beam defining at least a portion of said sides, wherein at least one each said first box beams define a lowest portion of each said side of said section, and wherein the shape of the bottom of each said first box beam defining a lowest portion of each said side of said section further accommodates the positioning of said inflatable devices;

at least two cross members, each said cross member having two ends, each said end of said cross member in operable communication with one of two said first box beams and approximately perpendicular to each said first box beam to form at least one rectangular frame, wherein said cross members define at least one cavity bounded by said first box beams, said cross members and said top and bottom decking, and wherein said cavity may be filled with foam to increase the buoyancy of said system.

14. The system of claim 13 in which each at least two said cross members are box beams comprising at least a portion of each of said ends of said sections.

15. The system of claim 13 in which each said side of said section further comprises at least one second box beam in operable communication with said first box beam, wherein said second box beam is positioned above said first box beam to increase the freeboard of said section.

16. The system of claim 10 in which each said inflatable device is an inflatable tube having a cylindrical shape, wherein said tube is deflated for storage and transport of said system.

17. The system of claim 10 in which said coupling elements are constructed of high modulus fibers (HMF).

18. The system of claim 17 in which said high modulus fibers are selected from the group consisting of: fibers consisting of long molecular chains produced from polyparaphenylene terephthalamide, liquid crystal polymer (LCP) fibers, ultra-high molecular weight polyethylene formed in a gel-spinning process, highly oriented rigid molecular structure fibers containing para-Aramid linkages, electron beam cross-linked thermoplastic polyurethane fibers, polyethylene napthalate fibers, lightweight high-strength polyethylene fibers, and combinations thereof.

19. A transporter for carrying a compliant flotation system for supporting conveyances above a fluid, said flotation system comprising multiple sections each said section having a top incorporating at least decking, a bottom, two sides and two ends, said top parallel to said bottom, said sides parallel one to the other and said ends parallel one to the other, each said section connected one to another via connectors at each end of said top of each said section and flexible fabric coupling elements selected from the group consisting of straps, ropes, cables and combinations thereof, each said section further comprising at least two inflatable devices in operable communication with said bottom of said section, said inflatable devices oriented approximately perpendicular to the resultant length of said system, wherein each said coupling element is tensioned via said slidable connectors prior to use of said system, and wherein each said flexible fabric coupling element is in operable communication with two said sections for the purpose of supporting said sections in tension, and wherein said flotation system is supported in compression by at least said decking and said decking support, and wherein said system may be deployed in conditions up to at least sea state 3.

20. The transporter of claim 19 in which said flotation system is configured as multiple six-section packages for transport and storage, wherein said sections are stored spatially efficiently on said transporter by storing as said six-section packages, each six-section package assembled by placing each said bottom of two sections together to create a pair and positioning two said pairs of said sections together and internal to said package, one section positioned with said bottom side adjacent each side of said internal pairs to create said six-section package, thus protecting said inflatable devices from environments external to said system when in storage and transit, wherein said flotation system may be assembled using Commercial Off-The-Shelf (COTS) equipment and tools, and wherein said flotation system may be assembled from a position on top of said sections as initially deployed in said fluid.

21. The transporter of claim 20 in which said transporter is a shallow-draft vessel.

22. The transporter of claim 21 in which said shallow-draft vessel is a high-speed vessel.

23. The high-speed vessel of claim 22 in which said high-speed shallow-draft vessel is the Joint High Speed Vessel (JHSV).

* * * * *